United States Patent [19]
Hawrylko

[11] Patent Number: 5,198,170
[45] Date of Patent: Mar. 30, 1993

[54] METHOD FOR EXTRUSION OF POWERED PVC COMPOUNDS

[75] Inventor: Roman B. Hawrylko, Avon Lake, Ohio

[73] Assignee: The B. F. Goodrich Company, Brecksville, Ohio

[21] Appl. No.: 930,972

[22] Filed: Aug. 17, 1992

Related U.S. Application Data

[63] Continuation of Ser. No. 762,293, Sep. 19, 1991, abandoned.

[51] Int. Cl.$^5$ .............................................. B29B 11/10
[52] U.S. Cl. ................................. 264/141; 264/177.1; 264/211.21; 264/211.23; 264/349; 425/204
[58] Field of Search ................... 264/177.1, 141, 142, 264/117, 140, 211.21, 211.23, 349; 425/204

[56] References Cited

U.S. PATENT DOCUMENTS

| | | |
|---|---|---|
| 3,374,296 | 3/1968 | Janeschitz-Kriegl et al. ............................ 264/211.21 |
| 3,884,607 | 5/1975 | Gerhards ............................ 425/204 |
| 4,243,629 | 1/1981 | Tramezzani ...................... 264/221.21 |
| 4,446,086 | 5/1984 | Molenaar et al. ................... 264/141 |
| 4,871,498 | 10/1989 | Nakamura et al. ................. 264/140 |
| 4,889,673 | 12/1989 | Takimoto ............................ 264/349 |

OTHER PUBLICATIONS

Encyclopedia of PVC, vol. 1, p. 200.

Primary Examiner—Jeffery Thurlow
Attorney, Agent, or Firm—Miles B. Dearth

[57] ABSTRACT

This invention discloses an improved method for powder PVC extrusion using particulate PVC resin specified herein which enables smooth, dull surfaces for extrudates under broad processing conditions, in particular at relatively lower shear and temperature. The resins are characterized as having an average particle size ranging from 50 to 125 microns, a DOP porosity of from about 0.27 cc/gm to about 0.5 cc/gm, and a friability rating of 5 or less, preferably 2 or less depending on the stock temperature range during extrusion.

8 Claims, 16 Drawing Sheets

EX. E
30 RPM

CONTROL C1
30 RPM

CONTROL
CUBES
30 RPM

EX. E
30 RPM

EX. A
30 RPM

CONTROL CI
40 RPM

CONTROL
CUBES
40 RPM

EX. E
40 RPM

EX. A
40 RPM

CONTROL C1
50 RPM

CONTROL
CUBES
50 RPM

EX. E
50 RPM

EX. A
50 RPM

CONTROL C2
750 RPM

CONTROL C1
750 RPM

EX. D
750 RPM

EX. C
750 RPM

CONTROL CI
1250 RPM

EX. B
750 RPM

EX. C
1250 RPM

CONTROL C2
1250 RPM

EX. B
1250 RPM

EX. D
1250 RPM

CONTROL C2
1600 RPM

CONTROL C1
1600 RPM

EX. D
1600 RPM

EX. C
1600 RPM

VISUAL ORANGE PEEL
STANDARD RATING 1

EX. B
1600 RPM

VISUAL ORANGE PEEL
STANDARD RATING 3

VISUAL ORANGE PEEL
STANDARD RATING 2

VISUAL ORANGE PEEL
STANDARD RATING 5

VISUAL ORANGE PEEL
STANDARD RATING 4

METHOD FOR EXTRUSION OF POWERED PVC COMPOUNDS

This is a continuation of application Ser. No. 07/762,293 filed Sep. 19, 1991 now abandoned.

FIELD OF THE INVENTION

This invention pertains to improved particulate PVC formulations for extrusion, in particular for multiscrew powder extrusion processes of rigid powder compounds in the manufacture of pellets or profile articles.

BACKGROUND OF THE INVENTION

PVC resin powder compositions for extrusion melt processing have enjoyed widespread usage for many years. As initially developed in the art, these materials, which now are commonly known as "dry blends" or "powder blends," were prepared, for the most part, in blade-type mixers at low shear rates and with the application of heat. Such dry blends have been prepared in high shear mixers wherein the heat necessary for intimate blending of the compounded ingredients is generated within the mixer by friction between impinging resin particles or from contact of the resin particles with metal components in the mixer. Suitable high speed mixers include a Henschel ® fluid mixer. A Papenmeier Universal Dry Mixer is suitable, and available from Welding Engineers Inc., Blue Bell, Pa. By using either the low or high shear mixing method, the maximum temperature attained during the dry blending process usually varies between 180° and 260° F., depending upon the particular formulation prepared. It is well understood that dry blending does not change the morphology of PVC agglomerate particles (grains). Dry blends introduced into an extruder for melt processing into pellets or directly into extruded profiles must undergo heat and work in order to breakdown the grain structure of PVC.

Spray-dried emulsion or dispersion polymerized PVC powder consists of loose agglomerates of PVC particles having a typical particle size average of about one to two microns. Extrusion of emulsion PVC powder into acceptable profiles can be accomplished over a wide range of temperatures and shear rates, in particular at reduced temperatures and low shear rates. There are drawbacks in the use of emulsion or dispersion spray-dried resins, namely, the cost of these resins is about double that of suspension resins, and there are constant dusting problems in handling these fine powders which lead to health and hygiene concerns. Suspension and mass polymerized PVC resins have lower cost and low dusting. Nevertheless, these resins have a more limited processing window compared to emulsion or dispersion resins. It would be desirable if one could obtain a suspension or mass polymerized PVC resin in the form of a powder compound which has a broader processing window.

Ready-to-use cubes are commercially available and made from suspension resins among other types. Cubes are prepared by milling PVC powder in the melt state on a device such as a Ferrell mill or Banbury ® Mill equipped with a cuber or dicer. Pellets represent PVC compound which has already achieved melt homogenization, but under lower temperatures and lower shear conditions compared to powder extrusion and the powder pelletizing process. Because of the prior heat and work history imparted to cubed compounds, they readily fuse on subsequent re-melting in an extruder. Fusion or gelation of PVC is for practical purposes, irreversible. Once PVC is heated sufficiently for fusion as in cubes, on subsequent re-heating the previous temperature of fusion must be reached or exceeded to avoid melt fracture, seen as roughness. During cube formation sufficient breakdown of PVC grain structure results in primary particle flow units of about 1 micron in size. Extrusion of cubes can thus be accomplished at lower stock temperatures as it is necessary only to soften the compound sufficiently for movement of the primary flow units.

One of the first considerations in profile extrusion is that of dimensional control. Profiles are often complex with several of the dimensions of critical importance to the function of the profile. There are two general approaches for achieving this dimensional control. One approach is to extrude a very high viscosity melt, at low melt temperature, where the shape is maintained out of the die. Jigs or fingers are often used to maintain the proper shape and dimensions. Of course, the stiffness of the melt is important in preventing sagging and loss of shape. Air or water spray may be used for cooling. This approach requires the use of cubed compound and a single screw extruder. Cubes are prepared at 340° F. or less. Cube extrusion is then conducted at 350° F. and higher and a smooth extrudate is obtained. In cube extrusion PVC begins to flow as a collection of primary particle flow units as soon as the compound softens sufficiently to be deformed by the rotating screw(s). These primary particles survive as the basic flow units through the extruder and die and result in a smooth but dull surface on the profile. A smooth but shiny extrudate is obtained from cubes at stock temperatures higher than about 375° F. In the process of direct powder extrusion or extrusion of pellets prepared from powder, there is a different temperature profile with respect to attaining a smooth, dull extrudate. Within a temperature range of from 315° F. to 340° F., powder or pellet extrusion a dull finish is obtained but the extrudate does not exhibit as smooth a surface as an extrudate from cubes. Within this temperature range, melt viscosity is relatively higher and more work is imparted to the compound. Improvements are needed. There is an intermediate temperature range from about 340° F. to about 375° F. where a rough extrudate is produced as the reduced viscosity lowers the available work input. Fusion and higher shear rates leads to greater melt fracture, seen as chunky or agglomerate flow rather than primary particle flow. This roughness is commonly referred to as orange peel. At higher temperatures ranging from 375° F.–420° F., a smooth extrudate is obtained from powder or pellets because of decreased viscosity, higher fusion and flow. The need for sizing and support for the weak extrudate is important at this high temperature range. Moreover, because of these conditions, a glossy surface is obtained which is often not desirable for certain applications including the manufacture of vertical blind profiles.

In the powder extrusion method to prepare pellets as opposed to the cubing process, PVC powder is fed through a hopper into a cylindrical barrel of an extruder containing one or two screws. The barrel which is divided into a plurality of heating zones is heated to a temperature above the melting or flow point of the plastic material. Screw(s) within the barrel are turned to mix and move the plastic material through a feed zone, a compression zone and a metering zone toward a crosshead. A kneader is a type of single screw extruder but includes axial oscillation of the screw, and mechanically synchronized with it's rotation. These are produced by Buss-Condux, Inc. and can effectively homogenize at a screw length:diameter ratio (L/D) of 7:1 to form pellets. The heated walls and internal frictional heat from the compound walls and rotating screws cause the plastic material to change from the solid state to the molten state. As a result, a melt pressure is developed. The molten compound is forced through a multihole die in the crosshead. The pelletizing process imparts a higher heat history to the compound than the milling-cube process. As PVC can be damaged at elevated temperatures of melt processing, there are obvious limits to the amount of total heat energy and work input allowable, due the well understood thermolability of PVC. The thermal degradation of PVC follows first order reaction kinetics. The allowable time of exposure to heat greatly increases, in fact approximately doubles for every 20° F. reduction in temperature of processing. Pellets have advantages over cubes in that they generally have higher bulk density and feed characteristics for extrusion.

A critical process parameter in the extrusion process is the point during extrusion, at which fusion of the compound stock is achieved. The point where fusion takes place is the point at which the powder compound has undergone physical change from the original PVC grains which are actually agglomerated primary particles, to a state in which individual primary particles and molten PVC become entangled. The point at which fusion takes place is controlled by a variety of factors. The rheology of PVC undergoing fusion has been extensively characterized and is studied, for example, by the use of a Brabender ® plastograph. This is a rotational viscometer with a fusion head equipped with two connected rotor chambers. Two mixing rotors in the rotor chambers rotate in opposite directions and with different rotational velocity. The instrument has a temperature sensing probe as well as torque measuring of the moment of resistance against rotation. This device simulates the transformations which occur during the extrusion process where a powder compound undergoes the physical transformation from powder to melt. For example, torque measurements in Brabender fusion head typically reach a maximum as agglomerates breakdown. As shear heating occurs, the stock temperature increases. This is followed by a decrease in melt viscosity, evidenced by lower torque readings. At the equilibrium torque, a significant number of primary PVC particles have lost their identity but some remain. During continuous extrusion of PVC, crystallites are still present as these have melt temperatures higher than the stock temperature at the extrusion die, yet good fusion is achieved. On a microscopic scale, PVC primary particles can still be detected as dispersed throughout the melt regions. Chartoff has studied the fusion of powder PVC during a single pass through an extruder to confirm this observation.[1]

[1] Observations On Particle Structure, Breakdown and Fusion during Extrusion of Rigid PVC, Society of Plastic Engineers, ANTEC Technical.

Conventional, rigid powder PVC compounds comprise suspension PVC resins having an average particle size of from about 140 microns to about 200 microns. The conventional high bulk density PVC resins generally have porosity of about 0.20–0.24 cc/gm DOP. Porosity of resins used for rigid articles can be in this lower range without detrimental processing effects since large quantities of plasticizer are not used. High extrusion output is dependant on the amount of material which can be conveyed to the extruder barrel per unit time, hence the bulk density of the powder compound is important. Typically the bulk density of high output powder PVC resins is on the order of greater than about 0.55 gm/cc. The movement in industry to powder and pellet compound extrusion at higher running temperatures has enabled improved output rates to be achieved. However at relatively higher temperatures, the melt viscosity, hence, melt strength of the extrudate is reduced as pointed out above. Various post-extrusion sizing apparatus mentioned above are often necessary because of the reduced melt strength of this hotter extrudate. For many intricate profile shapes, sizing devices which temporarily support the shape during partial cooling are not feasible, hence the need to run cooler in these instances.

An exemplary PVC profile derived from the powder compounds is a vertical louver. PVC vertical louvers are commercially abundant and are formulated from general purpose extrusion grade PVC having an inherent viscosity (I.V.) of from about 0.85 to 1.0. High bulk density, low porosity resins formulated into extrusion powder compounds require higher shear and temperatures in order to achieve adequate breakdown into primary PVC particles which then fuse in the extrusion process. Thus, conventional suspension or mass PVC resins extruded under lower shear and reduced stock temperatures exhibit inadequate fusion characteristics leading to unacceptable surface roughness. In order to extrude conventional suspension and mass PVC resins, higher shear is used which results in relatively higher stock temperatures. This degree of heat and work are needed to break down the PVC grains before smooth primary particle flow can occur. Sufficient fusion must be achieved in order to obtain good physical properties such as tensile strength and impact resistance of the extrudate. Where it is desired to extrude a conventional powder compound at relatively lower temperature and reduced shear, it is observed that inadequate breakdown of agglomerates takes place, resulting in partial primary particle flow and inadequate fusion and a rough appearance for the extruded profile. Rough appearance can be characterized by the use of two methods, micro-surface roughness and visual orange peel. Both are needed to accurately evaluate surface appearance. Micro-surface roughness can be measured with a Certronics ® surface analyzer. This device measures the average depth in microns between peaks and valleys at the surface of an extruded article. The instrument is passed over the surface and detects surface irregularities along r a narrow line of the surface. Larger or dispersed patterns of imperfections such as grainy appearance and orange peel are not detected by this device, thus requiring visual evaluation. Visual orange peel is a subjective rating made by comparison of low angle illuminated surfaces pre-assigned a standard rating from one to five with the test specimen. By combining micro-surface measurements with low angle, lighted microscope visual observation of orange peel compared to reference standards, one can accurately characterize the surface of extrudates. Photo micrographs of standards are illustrated in FIGS. 28–32 for surfaces having a rating of 1 to 5 respectively. An extrudate having a visual orange peel rating of 2.25 or less is considered commercially acceptable.

In light of the productivity advantages of powder extrusion, the economic advantages over dispersion resins of suspension or mass PVC, and taking into account the limitations in processing conventional suspension or mass PVC powder compounds, it would be advantageous to arrive at improved methods for extrusion of powder compounds comprising, suspension or mass PVC resins, which will overcome these limitations. Specifically it would be desirable to achieve lower shear and/or lower temperatures of fusion while achieving smooth extrudates. Lower temperature extrusion would enable higher melt strength achievement in order to preserve extrudate critical dimensions while still achieving a smooth dull finish for the extrudate, eliminating or minimizing orange peel and where applicable, the need for sizing apparatus.

SUMMARY OF THE INVENTION

It is an object of the present invention to provide an improved method for extruding a powder PVC compound comprising the use of specified suspension or mass PVC resins. The object of the invention is particularly directed to the multi-screw extrusion process for extruded articles such as pellets and the single screw or multiscrew extrusion process of fabricating pellets for subsequent profile extrusion.

It is a specific object of the present invention to provide a method of extruding PVC powder compounds and pelletized powder compounds at reduced stock temperatures and at lower shear rates, wherein the stock temperature is in a specified range, the method resulting in a smooth dull surface for the extrudate.

It is a specific aspect of the present invention to provide improved PVC powder extrusion methods using powder compounds comprising specified PVC resin, made for example by the mass or preferably suspension process, in combination with optional compounding components such as processing aid(s), stabilizer(s), pigment(s), filler(s), impact modifier(s), lubricant(s), colorant(s) and the like.

These and other aspects of the invention are achieved by extrusion, either single or multi-screw extrusion, of a powder compound to produce an extruded article, for example, pellets, and extruded profiles, the powder compound comprising a PVC resin having a particle size average in a range of about 50μ to 125μ, preferably in a range of 60μ to 115μ, more preferably in a range of from 70μ to 100μ; a DOP porosity from about 0.27 cc/gm to about 0.50 cc/gm, preferably from 0.44 cc/gm to about 0.50 cc/gm; and a friability rating, defined herein, of 5 or less, preferably 1 or 2, and most preferably a friability rating of zero, and wherein the stock temperature during extrusion is maintained at a temperature in the range of from about 315° F. to 390° F.

It is another aspect of the present invention to provide a method for extruding a compound, comprising extruding a powder PVC compound, the compound comprising a PVC resin having a particle size average in a range of from about 50 to 125μ, preferably 60μ to about 115μ, more preferably 70μ to 100μ; a DOP porosity from about 0.27 cc/gm to about 0.5 cc/gm, preferably from 0.44 cc/gm to about 0.50 cc/gm, and a friability rating of 5 or less and wherein the stock temperature during extrusion is maintained in a range from about 315° F. to about 350° F.

It is yet another aspect of this invention to provide a method of extruding improved powder PVC compounds to form pellets, comprising extrusion of a powder PVC compound containing a PVC resin having a particle size in average from 50 to 125μ, preferably 60μ to about 115μ, more preferably 70μ to 100μ; a DOP porosity from about 0.27 cc/gm to about 0.5 cc/gm, preferably from 0.44 cc/gm to about 0.50 cc/gm, and a friability rating of 2 or less and wherein the stock temperature during extrusion is maintained in a range from about 350° F. to about 390° F.

DETAILED DESCRIPTION OF PREFERRED EMBODIMENTS

Figure 2:
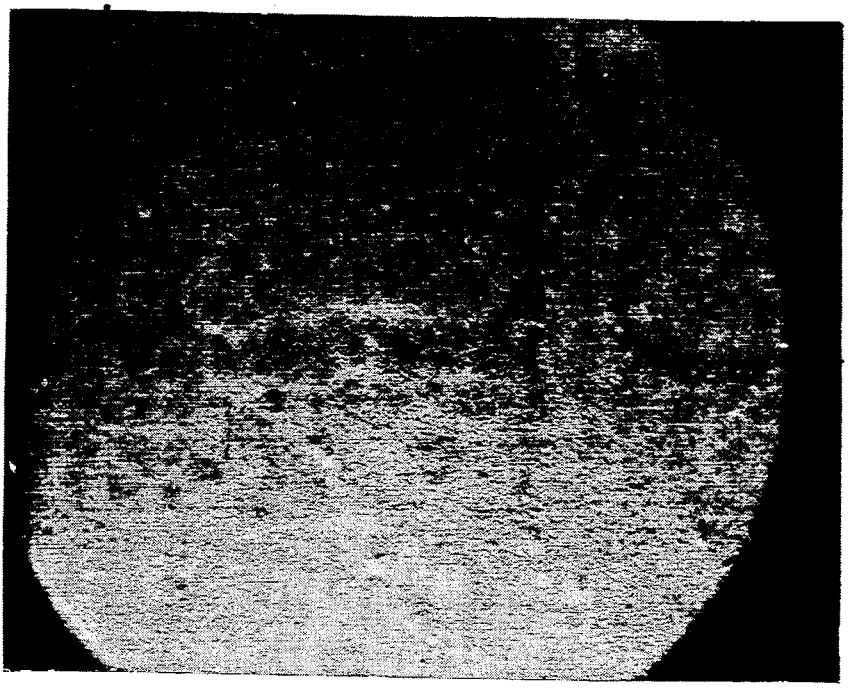
FIG. 2 is a photo micrograph at 1.6× of the surface of an extrudate of pelletized control powder compound using resin C1, extruded with a single screw extruder at 30 rpm.

Polyvinyl chloride polymers are widely available throughout the world. Polyvinyl chloride resin as referred to in this specification includes polyvinyl chloride homopolymers, vinyl chloride copolymers, graft copolymers, vinyl halide polymers polymerized in the presence of any other polymer such as a high heat distortion temperature enhancing polymer, impact toughener, barrier polymer, chain transfer agent, stabilizer, plasticizer or flow modifier. For example a combination of modifications may be made with the PVC polymer by overpolymerizing a low viscosity, high glass transition temperature (Tg) enhancing agent such as SAN resin, or an imidized polymethacrylate in the presence of a chain transfer agent. In another alternative, vinyl chloride may be polymerized in the presence of said Tg enhancing agent, the agent having been formed prior to or during the vinyl chloride polymerization. However, only those resins possessing the specified average particle size and degree of friability exhibit the advantages applicable to the practice of the present invention. Therefore, a description of a method of preparing a suitable PVC resin for use herein is by exemplified by the aqueous suspension method.

In the practice of the invention there may be used polyvinyl chloride homopolymers or copolymers of polyvinyl chloride comprising one or more comonomers copolymerizable therewith. Suitable comonomers for vinyl chloride include acrylic and methacrylic acids; esters of acrylic and methacrylic acid, wherein the ester portion has from 1 to 12 carbon atoms, for example methyl, ethyl, butyl and ethylhexyl acrylates and the like; methyl, ethyl and butyl methacrylates and the like; hydroxyalkyl esters of acrylic and methacrylic acid, for example hydroxymethyl acrylate, hydroxyethyl acrylate, hydroxyethyl methacrylate and the like; glycidyl esters of acrylic and methacrylic acid, for example glycidyl acrylate, glycidyl methacrylate and the like; alpha, betaunsaturated discarboxylic acids and their anhydrides, for example maleic acid, fumaric acid, itaconic acid and acid anlydrides of these, and the like; acrylamide and methacrylamide; acrylonitrile and methacrylonitrile; maleimides, for example, N-cyclohexyl maleimide; olefin, for example ethylene, propylene, isobutylene, hexene, and the like; vinylidene halide, for example, vinylidene chloride; vinyl ester, for example vinyl acetate; vinyl ether, for example methyl vinyl ether, allyl glycidyl ether, n-butyl vinyl ether and the like; crosslinking monomers, for example diallyl phthalate, ethylene glycol dimethacrylate, methylene bis-acrylamide, tracrylyl triazine, divinyl ether, allyl silanes and the like; and including mixtures of any of the above comonomers. The preferred composition is a polyvinyl chloride homopolymer.

Two example preparation methods are contemplated within the scope for the particular PVC resins employed herein. PVC resin can be prepared for example, by the suspension or mass techniques, provided that certain considerations be addressed in order to arrive at the required resin particle characteristics detailed below. The preferred process for preparing polyvinyl chloride resin for use in this invention is the aqueous suspension process, as the suspension polymerization process is economical. In the aqueous suspension polymerization method, vinyl chloride monomer and optional comonomers are suspended in water under agitation with the use of primary dispersants and preferably include secondary dispersants. A monomer soluble free radical initiator is introduced, and at a suitable temperature, polymerization is commenced. After the desired weight percent of monomers have been converted, the polymerization is stopped, monomer is stripped and the resin is dried.

In suspension polymerization, the type and amount of dispersants as well as the agitation have effects on the friability and average particle size obtained. The primary dispersant can be a partially saponified polyvinyl alcohol (PVA) with a degree of saponification at least above 60 mole percent, preferably above 80 mole percent. Exemplary primary dispersants are Poval ® L-9 ex. Kuraray Co., Ltd., and Gohsenol ® KZ06 ex. Nippon Gohsei. Alternatively, two, PVA dispersants can be combined such as Alcotex 72.5 and Alcotex 55. Particle size is also controlled by agitation speed and shear levels which can be adjusted to yield the required average particle size within the range specified.

The catalyst used may be any suitable catalyst for a polyvinyl chloride polymerization, including for example ethylhexyl peroxydicarbonate and sec-butyl peroxydicarbonate. The catalyst is added in an effective amount which is usually from 0.03 to 0.05 phm (or the molar equivalent) and preferably at 0.045 parts (or the molar equivalent) per hundred monomer by weight. In addition, it may be advantageous to use a catalyst emulsifier, such as a primary emulsifier, with the catalyst. In this case the catalyst emulsifier may be used in amounts of 0.004 to 0.024 parts per hundred monomer by weight, and preferably from 0.008 to 0.016 parts per hundred monomer by weight.

A mass process is disclosed in U.S. Pat. No. 3,522,227 which is incorporated herein by reference. Certain modifications are recommended in this process in order to arrive at mass PVC resins suitable for use in the present invention. In the pre-poly reaction the resin is seeded and this seed morphology is retained on subsequent reaction in the autoclave. Pre-poly reaction pressures should be maintained within a range of from about 150 to 160 psig. Pre-poly conversion of monomer should be limited in a range of from 8 to 10% by weight. Agitator tip speed in the prepolymerizer should be increased. A porosifier such as glycerol at about 0.05 phm can be introduced in the prepolymerizer. In the second step reaction in the autoclave, a typical reaction time of about 3 hours should be reduced by approximately 30 minutes. Percent conversion can be reduced, in addition, by intermediate degassing of monomer during autoclave polymerization. With these modifications, one can use the mass process to prepare particulate PVC resins having the specified particle characteristics for use in the present method.

A skinless, porous suspension PVC process is disclosed in U.S. Pat. No. 4,711,908 incorporated herein by reference. This process must be modified by controlling the agitation. Specifically, agitation should increased. Referring to these examples of U.S. Pat. No. 4,711,908 at column 15, the rpm of a standard Pfaudler agitator should be increased 50 to 100 percent.

POWDER COMPOUNDS

Rigid or flexible powder PVC resin compounds typically contain a variety of components selected according to the performance requirements of the article produced therefrom and beyond the scope of the present invention. The powder compounds used herein contain effective amounts of these components ranging from 0.01 to about 500 weight parts per 100 weight parts PVC (parts per hundred resin- phr). For example, various primary and/or secondary lubricants such as oxidized polyethylene, high melt flow polypropylene, paraffin wax, fatty acids, and fatty esters and the like can be utilized. Thermal and UV stabilizers can be utilized such as various organo tins, for example dibutyl tin, dibutyltin-S-S'-bi-(isooctylmercaptoacetate), dibutyl tin dilaurate, dimethyl tin diisooctylthioglycolate. Secondary stabilizers may be included for example a metal salt of phosphoric acid, polyols, and epoxidized oils. Specific examples of salts include water-soluble, alkali metal phosphate salts, disodium hydrogen phosphate, orthophosphates such as mono-, di-, and tri-orthophosphates of said alkali metals, alkali metal polyphosphates, -tetrapolyphosphates and -metaphosphates and the like. Polyols such as sugar alcohols, and epoxides such as epoxidized soya oil can be used. Typical levels of secondary stabilizers range from about 0.1 wt. parts to about 7.0 wt. parts per 100 wt. parts PVC (phr). In addition, antioxidants such as phenolics, BHT, BHA, various hindered phenols and various inhibitors like substituted benzophenones can be utilized.

When increased impact values are desired, impact modifiers can be included which are known to the art. For example, various impact modifiers are set forth in The Encyclopedia of PVC, Volume 2, Chapter 12, Marcel Dekker, Inc., New York, 1977, which is hereby incorporated by reference. Specific examples of impact modifiers include various acrylonitrile-butadiene-styrene (ABS) polymers, the various chlorinated polyethylenes, the various graft copolymers of acrylic rubbers, the various poly(ethylene-co-vinyl acetates), styrene-butadiene-styrene block copolymers, graft copolymers of methylmethacrylate, butadiene and styrene (MBS), graft copolymers of acrylonitrile, butadiene and styrene (ABS) and the like. Impact modifiers of these types are commercially available. Preferred impact modifiers include ABS, MBS, graft copolymers of acrylic rubbers, chlorinated polyethylene and mixtures. Regardless of the particular impact modifier utilized, the amounts thereof can naturally vary, depending upon the desired impact strength as typically measured by an Izod impact test (ASTM D256). The levels of impact modifier present typically vary from about 3 to about 30 phr. Accordingly, articles derived from the powder compounds of the present invention have the capacity to be impact-modified to achieve notched Izod values generally in excess of in excess of 100 N·m/m if desired.

Various process aids, fillers, pigments and reinforcing materials can also be utilized in amounts up to about 200 or 300 phr. Exemplary processing aids are acrylic polymers such as poly methyl acrylate based materials. Adjustment of melt viscosity can be achieved as well as increasing melt strength by employing 0.5 to 5 phr of commercial acrylic process aids such as those from Rohm and Haas under the Paraloid ® Trademark. Paraloid ® K-120ND, K-120N, K-175, and other processing aids are disclosed in *The Plastics and Rubber Institute: International Conference on PVC Processing*, Apr. 26-28 (1983), Paper No. 17. Examples of fillers include calcium carbonate, clay, silica and various silicates, talc, carbon black and the like. Reinforcing materials include glass fibers, polymer fibers and cellulose fibers. Such fillers are generally added in amounts of from about 3 to about 100 phr of PVC. Preferably from 3 to 50 phr of filler are employed for extruded profiles such as louvers. Examples of various pigments include titanium dioxide, carbon black and the like. Mixtures of fillers, pigments and/or reinforcing material also can be used.

Plasticizers may be included in any manner and amount. Exemplary plasticizers are set forth in *The Technology of Plasticizers*, by Sears and Darby, pages 893–1085, John Wiley and Sons, New York, 1982, which is incorporated herein by reference. Plasticizers are preferably absent, or present in minor amounts.

EXEMPLARY POLYMERIZATION PROCEDURE

In a 55 liter stainless steel reactor equipped with agitation, a vacuum is drawn to about 30 inches mercury. From about 145 to about 150 weight parts of deionized, demineralized water is introduced at ambient temperature, followed by introducing 100 parts of vinyl chloride monomer (VCM). Agitation is commenced at 550-600 rpm. Optional heat can be applied to heat the contents to about 53° C. Dispersants, Poval L9 at 0.035-0.075 weight parts per hundred weight parts of vinyl chloride monomer (parts per hundred monomer-phm) and Methocel® F-50 at 0.02 phm are added. These can be added typically as aqueous premixes. When the contents are allowed to be warmed, it is preferred to allow a delay of at least about 15 minutes after water and monomer reach temperatures of from 50°-60° C. before the addition of dispersants. Following introduction of dispersants, the reactor contents are agitated preferably for 15 minutes. The dispersants when introduced as a dispersion, are mixed with about 3 to 5 weight parts of water, per hundred weight parts VCM.

An initiator, secondary butyl peroxydicarbonate at 0.03 phm is dispersed in about 0.008 phm of PVA such as Poval® L-9 in about 3-5 phm water and introduced to the reactor. Polymerization is commenced and the temperature generally held between about 50° C. and 70° C. A polymerization arresting shortstop is used, such as a phenolic to terminate polymerization. If optional dispersants are used these can be added at 0.005 phm, with desirable improvement in bulk density. There are limitations to achieving higher bulk density in order to achieve the preferred friability. The weight perce it conversion of monomer is generally from about 70 to about 90%. If the mass process discussed above were used to prepare the resin, percent conversion must be kept low at around 40-50% conversion in order to achieve the preferred friability.

After polymerization is stopped, residual monomer is stripped by conventional means such as counter-current steam stripping, and the resin is dried by conventional means such as tray drying at elevated temperatures.

The polymerization resin product of the exemplary suspension process has a bulk density ranging from about 0.30 to about 0.50 gm/ml, and preferably will have a bulk density of from about 0.44 about 0.50 gm/ml, so long as the desired friability is achieved.

EXAMPLES

The particulate characteristics of resins suitable herein are an average particle size of from 50 to 125 microns, preferably an average particle size of from about 60 to about 115 microns. The desired porosity is measured using di-2-ethylhexyl phthalate in a procedure analogous to mercury intrusion porosity in ASTM D-2396. Thus, porosity is measured for a PVC resin by adding DOP to a known weight of the dry resin, allowing sufficient time for absorption into the pore spaces of the particles, centrifuging and decanting the excess DOP, and reweighing the saturated resin. Porosity is expressed as the volume (cc) of DOP retained per gram of PVC resin. The DOP porosity will range from about 0.27 cc DOP per gram sample of resin (cc/gm) to about 0.5 cc/gm.

Resin particle size can be characterized by a variety of established methods. ASTM D1705-1 illustrates the wet screen analysis method. ASTM D1921-63 illustrates the dry screen analysis method. In screen analysis, a series of standard mesh screens are employed and the percent weight retained on each screen is summed and normalized. A plot on log probability is made of mesh size vs. cumulative percent retained. The average particle size is taken at the point the line plot crosses 50% cumulative retained. The average particle size is the micron diameter at which half of the particles by weight are larger and half are smaller.

A third property of suitable resins employed herein is the friability rating. One method to test PVC resins for friability is to combine the PVC resin in a standard formula containing a dry, non-solvating plasticizer having low melt viscosity. In the tests below, Elvaloy® 742, a low viscosity ethylene copolymer. Any dry, non-solvating plasticizer for PVC having low melt viscosity may be chosen. A standard formula containing the test resin is used and mixed under carefully controlled conditions in a Brabender plasticorder to evaluate the ability of the resin to break down under controlled work input into dispersed primary particles. The standard formula contains the polymer plasticizer, 1 phr of distearyl pentaerythritol diphosphate lubricant, 3 phr of Mark® 235, a barium-cadmium complex stabilizer, 25 phr of calcium carbonate and 0.12 phr of carbon black. The plasticorder is pre-heated and maintained at 165° C. The dry blend is thoroughly hand mixed with a spatula and a 57 gram sample is introduced into the plasticorder equipped with a No. 6 mixing head and preset to 32 rpm. The blend is fused under heat and shear for 15 minutes, taking care to leave no unfused powder along the sides. A thin, molded plaque is made from a portion of the fluxed melt using a heated press at 175° C., and 625 psi, pressing for one minute. The press and molded film are allowed to cool while pressure is kept on the mold. A film of about 5-10 mills is thus produced. A resin exhibiting a zero friability will show no unfused gel particles in the pressed plaque. A resin having a friability rating of 5 will exhibit a very high level of gels throughout the area of the plaque. The friability of test resins is rated on a scale of from 0 to 5 as compared to standard plaques exhibiting a preassigned rating. The standard references and test specimens are always formulated and fused in the same manner so as to ensure internal consistency in the test. The reference standards are a zero friability resin, a resin having a friability of 5 and blends of these specified below. Geon® 92 is a skinless spherical PVC resin produced by the B. F. Goodrich Co. according to the process of U.S. Pat. No. 3,706,722, and having an average particle size of 300 microns. In the standard formula, Geon® 92 exhibits a zero friability. Geon® 30, available from the B. F. Goodrich Co., is a general purpose grade PVC resin exhibiting a friability assigned as 5, and has an average particle size of 150 to 170 microns. The standards are as follows:

Reference Std. "0" is 100 parts of Geon® 92.
Reference Std. "1" is a mix of Geon® 92: 80 parts and Geon® 30: 20 parts.
Reference Std. "2" is a mix of Geon® 92: 60 parts and Geon® 30: 40 parts.
Reference Std. "3" is a mix of Geon® 92: 40 parts and Geon® 30:60 parts.
Reference Std. "4" is a mix of Geon® 92: 20 parts and Geon® 30: 80 parts.
Reference Std. "5" is 100 parts of Geon® 30.

The standard which most closely corresponds to the test resin, formulated with the standard formula and treated as above is reported as the friability of the test resin.

In the direct powder multi-screw extrusion method of this invention wherein in a stock temperature is in the range of from 350° F. to 390° F., the powder compounds used in this invention include those containing PVC resins having a friability rating of 2 or less. More preferably, under these conditions, the resin included in the blend will have a friability rating of 1 or less, with the most preferred resin having a friability rating of zero.

Under extrusion conditions which result in a stock temperature of from 300° F. to 350° F., the powder compound used in the method of this invention can have a friability rating of from 0 to 5. Thus, in one method of the present invention, a resin having a friability rating of from 0 to 2, and an average particle size within the range specified above, and extruded at a stock temperature of between 350° F. and 390° F. yields improved visual orange peel and low micro-surface roughness observed, compared to conventional methods. Moreover, a resin having a friability rating of from 0 to 5 with an average particle size specified above and extruded at a stock temperature of between 315° F. and 350° F. yields likewise improved visual orange peel and micro-surface roughness.

The methods of this invention were exemplified by comparing example resins to a conventional cubed compound and two conventional powder compounds based on commercial PVC suspension resins having an I.V. of 0.92, and an average particle size in microns of 169 (Resin C1) and 139 (Resin C2), respectively. The friability of Resins C1 and C2 was 5. The control cubed compounds were expected to produce a smooth extrudate having low orange peel and surface roughness. The advantage of direct extrusion of powder compounds or extrusion of pelletized powder exists when a smooth surface with low surface roughness can be achieved, as near as possible to that obtained from a cubed compound.

EXAMPLES

The following homo-PVC resins with varying friability ratings, porosity and average particle sizes were compared in powder compounds. Particle size was measured using a standard mesh analysis shown below. The term "pan" refers to the percent weight of resin passing through a 200 mesh screen. The data below is listed as percent weight retained on the listed screen. From this distribution the weight average particle size was calculated and reported in microns.

| % Retained | Resin | | | | | | |
|---|---|---|---|---|---|---|---|
| | C1 | C2 | A | B | C | D | E |
| 40 mesh | 0 | 0 | 0 | 0 | 0 | 0 | 0 |
| 60 mesh | .99 | 0.5 | 0 | 0 | 0 | 0 | 0 |
| 80 mesh | 38.61 | 9.95 | 0 | 0 | 0 | 0 | 0 |
| 100 mesh | 29.21 | 23.88 | 0 | 3.3 | 1.0 | 3.3 | 0 |
| 120 mesh | — | — | 0 | 14.4 | — | 14.4 | |
| 140 mesh | 28.71 | 54.73 | 64.8 | 22.5 | 64.8 | 22.5 | 5.0 |
| 200 mesh | 1.98 | 9.95 | 31.6 | 38.8 | 31.7 | 38.8 | 80 |
| pan | 0.5 | 1.0 | 2 | 21 | 2 | 21.0 | 15 |
| Friability | 5+ | 5 | 4 | 1 | 5 | 3 | 0 |
| Avg. Part Size (μ) | 169 | 139 | 108 | 98 | 115 | 102 | 85 |
| Bulk Density 9 m/ml | | | 0.54 | 0.46 | 0.49 | 0.48 | 0.45 |
| I.V. | 0.92 | | 0.92 | 0.925 | — | — | 0.923 |
| DOP Porosity (cc/gm) | .23 | .283 | — | 0.4 | 0.3 | 0.31 | .44 |

In the examples listed in tables 1 and 2, three pellet compounds, made using resins C1, A, and E respectively were compared to cubes on a single screw extruder at 30, 40 and 50 rpm. Under these conditions the stock temperature achieved was reported. Pellets were prepared by combining a dry blend in a Henschel mixer. Powder compounds were pelletized on a Buss-Condux compounding pelletizer. Extrusion trials were run on a Davis Standard extruder equipped with a single, 2.5 inch diameter, 24 l/d, pin mixing screw. The following compound recipe was used for the evaluation listed in Tables 1 and 2:

| | Wt. Parts |
|---|---|
| Resin | 100 |
| Process Aid | 3 |
| Lubricant | 5 |
| Tin Stabilizer | 1 |
| Calcium Carbonate | 20 |

TABLE 1

Figure 1:
FIG. 1 is a photo micrograph of the surface of an extrudate of a control cubed compound at 1.6 times magnification (1.6×), extruded with a single screw extruder at 30 rpm.

| | EXAMPLES | | | |
|---|---|---|---|---|
| Conditions | Cubes | C1 | A | E |
| Zone 1 (Temp °F.) | 300 | 300 | 300 | 300 |
| Zone 2 (Temp °F.) | 300 | 300 | 300 | 300 |
| Zone 3 (Temp °F.) | 300 | 300 | 300 | 300 |
| Zone 4 (Temp °F.) | 300 | 300 | 300 | 300 |
| Zone 5 (Temp °F.) | 300 | 300 | 300 | 300 |
| Die (Temp °F.) | 310 | 310 | 310 | 310 |
| RPM | 30 | 30 | 30 | 30 |
| Stock Temp. (°F.) | 353 | 353 | 356 | 353 |
| Output Rate lbs./hr. | 151 | 156 | 162 | 162 |
| Avg. Micro Surface (μ) | 0.48 | 0.75 | 0.62 | 0.6 |
| Visual Orange Peel | 1.5 | 3.5 | 2.0 | 2.0 |
| See FIG. | FIG. 1 | FIG. 2 | FIG. 3 | FIG. 4 |

TABLE 2

Figure 6:
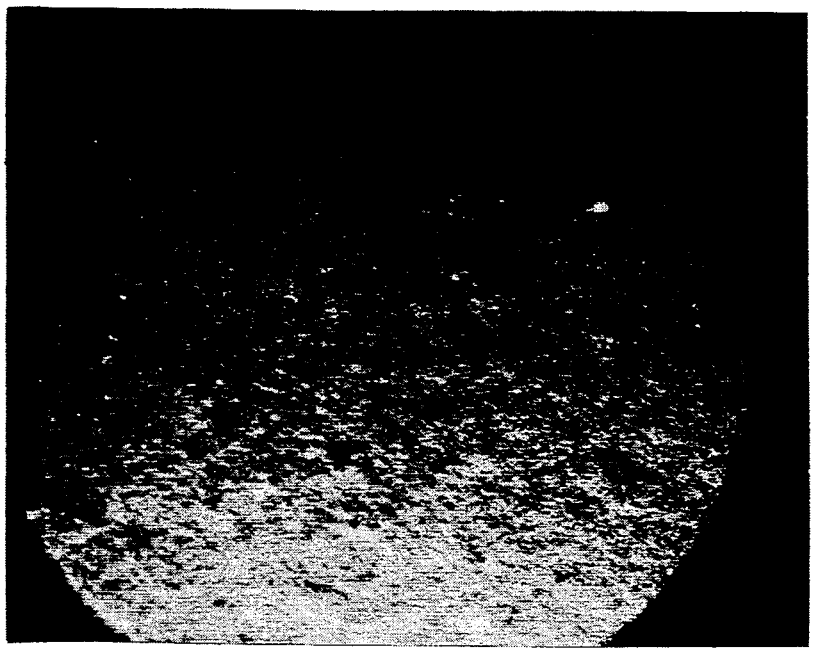
FIG. 6 is a photo micrograph at 1.6× of the surface of an extrudate of pelletized control powder compound using resin example C1, extruded with a single screw extruder at 40 rpm.
Figure 5:
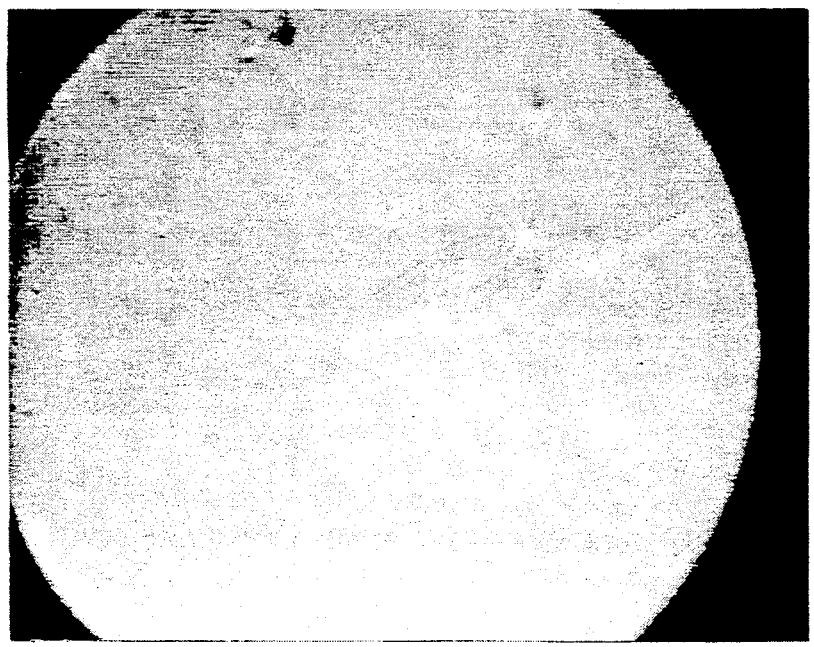
FIG. 5 is a photo micrograph at 1.6× of the surface of an extrudate of a control cubed compound, extruded with a single screw extruder at 40 rpm.

| | EXAMPLES | | | |
|---|---|---|---|---|
| Conditions | Cubes | C1 | A | E |
| Zone 1 (Temp °F.) | 300 | 300 | 300 | 300 |
| Zone 2 (Temp °F.) | 300 | 300 | 300 | 300 |
| Zone 3 (Temp °F.) | 300 | 300 | 300 | 300 |
| Zone 4 (Temp °F.) | 300 | 300 | 300 | 300 |
| Zone 5 (Temp °F.) | 300 | 300 | 300 | 300 |
| Die (Temp °F.) | 310 | 310 | 310 | 310 |
| RPM | 40 | 40 | 40 | 40 |
| Stock Temp. | 369 | 371 | 371 | 370 |
| Output Rate #/hr. | 207 | 209 | 205 | 212 |
| Avg. Micro Surface (μ) | 0.83 | 1.1 | 1.23 | 0.96 |
| Visual Orange Peel | 1.5 | 3.75 | 2.0 | 2.0 |
| See FIG. | FIG. 5 | FIG. 6 | FIG. 7 | FIG. 8 |

Figure 4:
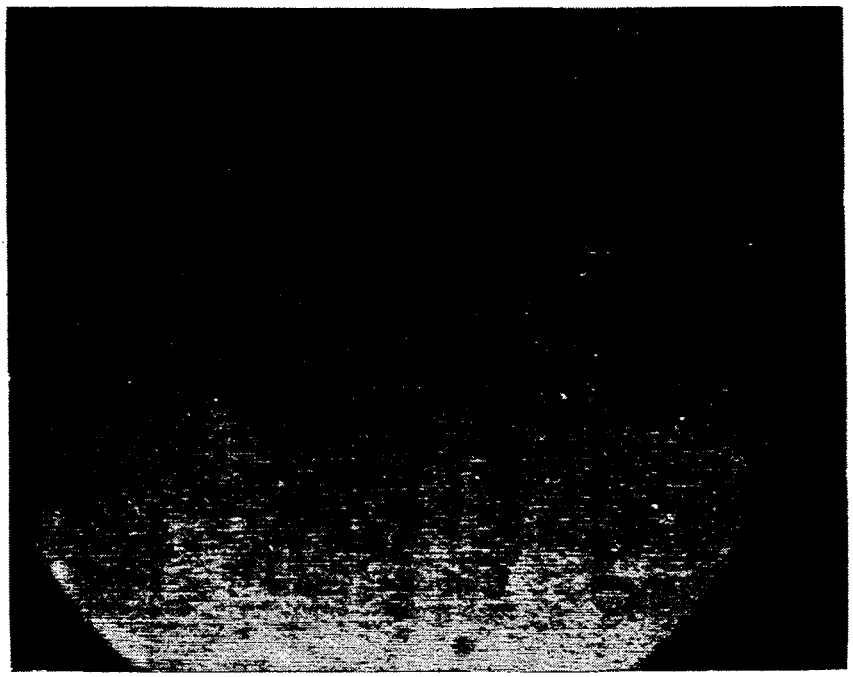
FIG. 4 is a photo micrograph at 1.6× of the surface of an extrudate of pelletized powder compound using resin example E, extruded with a single screw extruder at 30 rpm.
Figure 3:
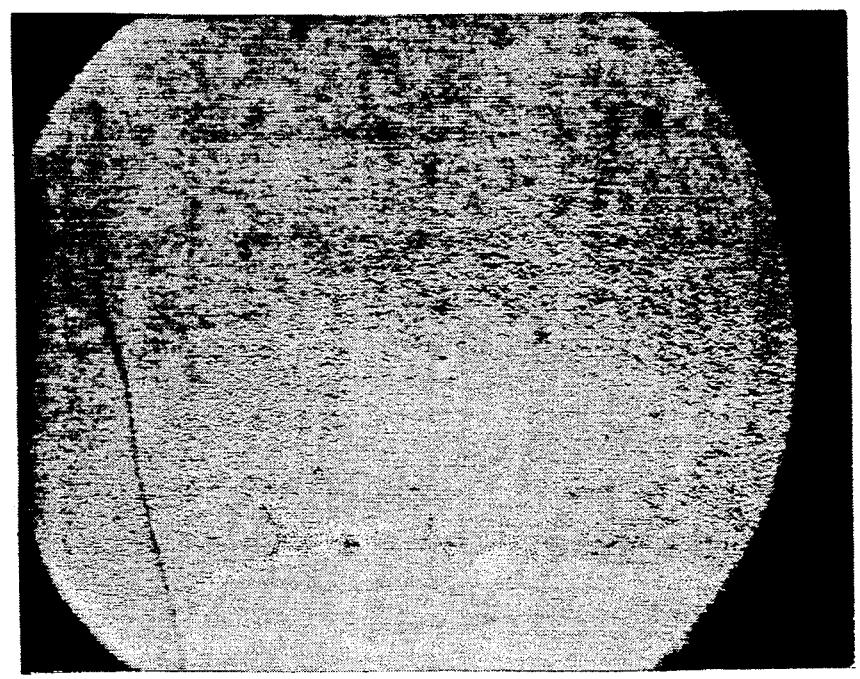
FIG. 3 is a photo micrograph at 1.6× of the surface of an extrudate of pelletized powder compound using resin example A, extruded with a single screw extruder at 30 rpm.

From the above tables and accompanying figures, the advantages of the method using Example A and E resin can be seen. Consistently, the compound made using these resins consistently exhibited low surface roughness as seen in the tables and low orange peel as seen in the accompanying figures compared with pelletized powder compound containing control resin C1. The surface roughness of Example E was closest to that of the control cubes run at the same zone temperatures and RPM. Referring to Table 1 and FIGS. 1-4, at 30 rpm, the stock temperatures remained between 350° F. and 353° F. Note FIG. 1 for cubes, shows a smooth, uniform, flat surface, whereas conventional resin C1 has some irregularities evidencing incomplete breakdown of grains. FIGS. 3 and 4 do not have any irregularities and compare closely with FIG. 1 by visual inspection and by micro-surface analysis.

Figure 8:
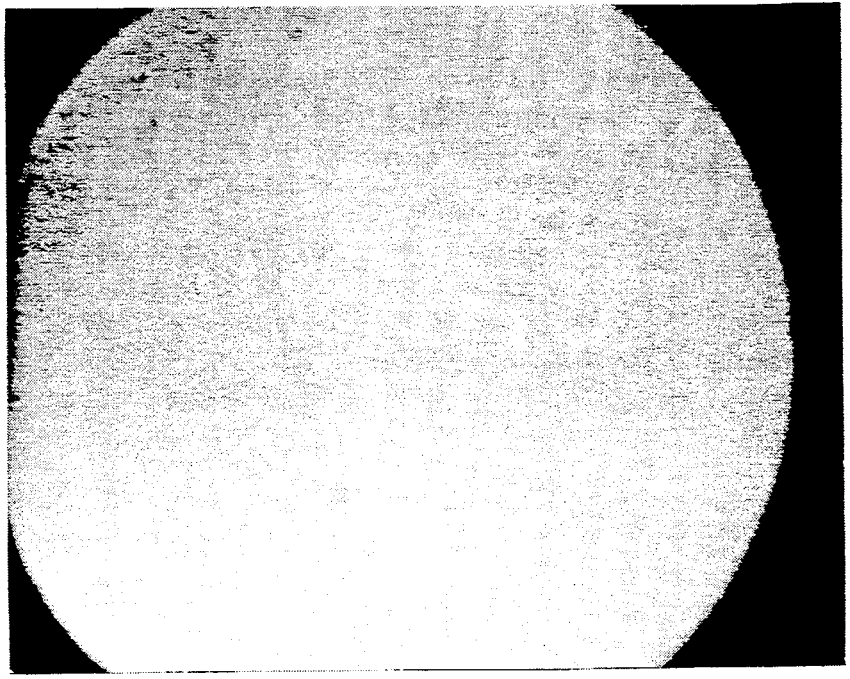
FIG. 8 is a photo micrograph at 1.6× of the surface of an extrudate of pelletized powder compound using resin example E, extruded with a single screw extruder at 40 rpm.
Figure 7:
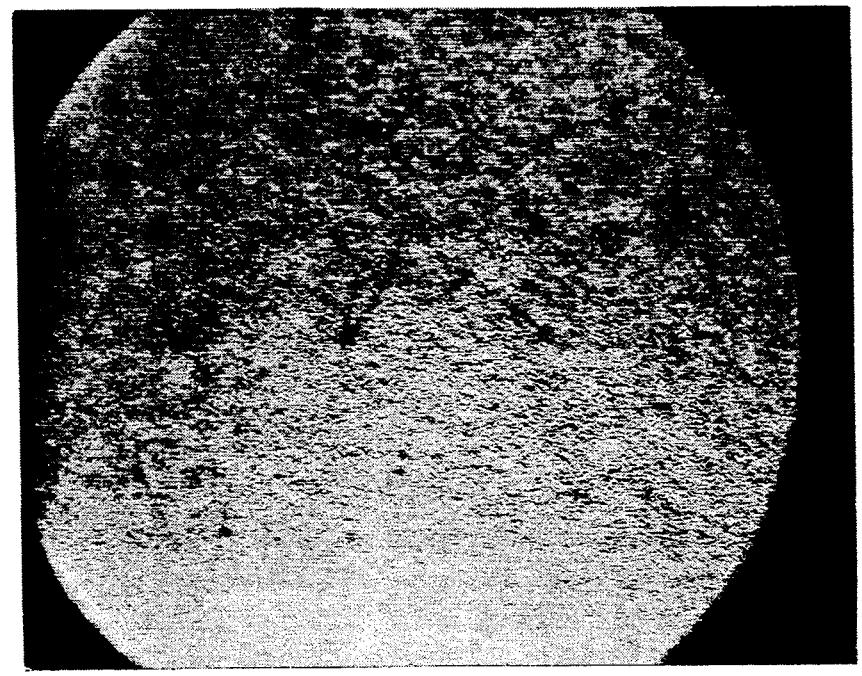
FIG. 7 is a photo micrograph at 1.6× of the surface of an extrudate of pelletized powder compound using resin example A, extruded with a single screw extruder at 40 rpm.
Figure 10:
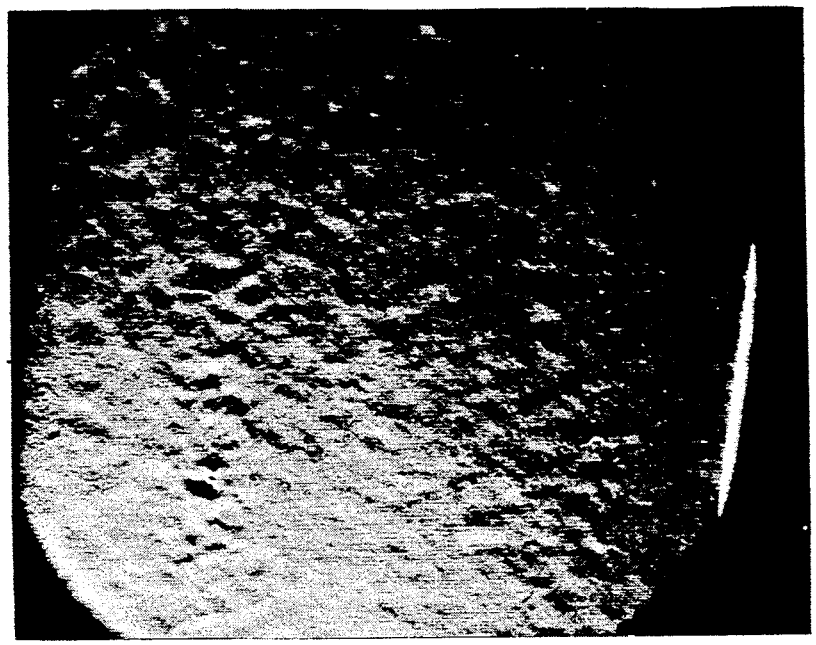
FIG. 10 is a photo micrograph at 1.6× of the surface of an extrudate of pelletized control powder compound using resin example C1, extruded with a single screw extruder at 50 rpm.
Figure 9:
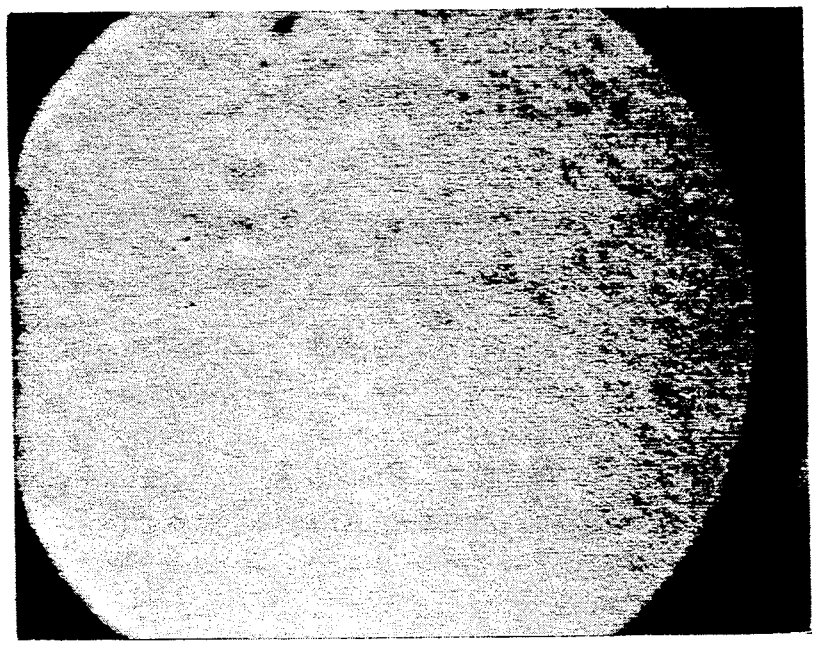
FIG. 9 is a photo micrograph at 1.6× of the surface of an extrudate of a control cubed compound, extruded with a single screw extruder at 50 rpm.
Figure 12:
FIG. 12 is a photo micrograph at 1.6× of the surface of an extrudate of pelletized powder compound using resin example E, extruded on a single screw extruder at 50 rpm.
Figure 11:
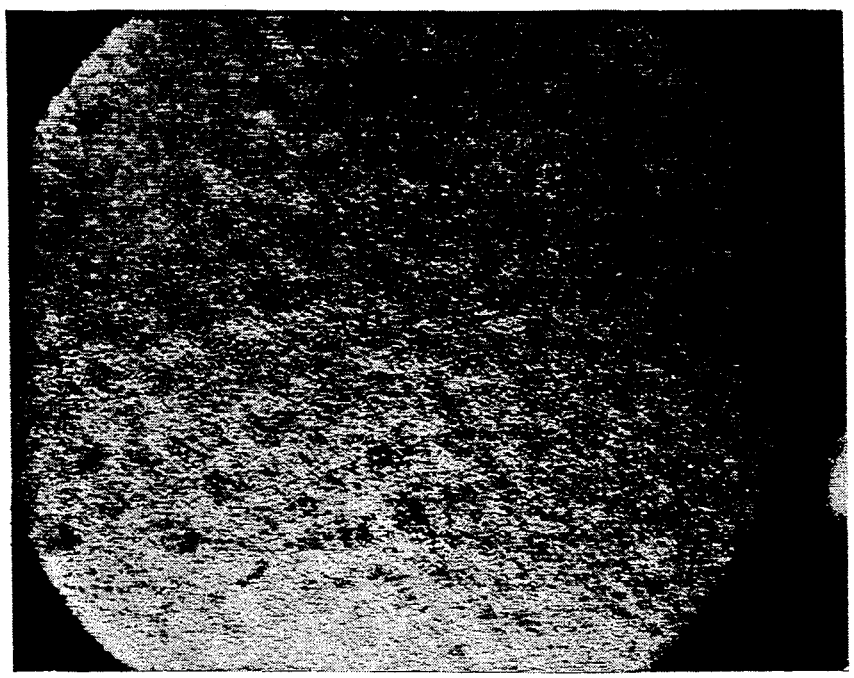
FIG. 11 is a photo micrograph at 1.6× of the surface of an extrudate of pelletized powder compound using resin example A, extruded with a single screw extruder at 50 rpm.

Referring to Table 2 and FIGS. 4–8, at 40 rpm and stock temperature ranging from 369° F. to 371° F., the advantages of using resins A and E are again seen. Resin E has a zero friability, and FIGS. 7 and 8 illustrate the uniformity compared with FIG. 6 for resin C1, showing a bumpy surface. This comparison evidences the criticality of using a resin having a friability rating of 0 to 2 or less when extruding at stock temperatures ranging from about 350° F. to 390° F. FIGS. 9–12 illustrate the appearance of the extrudate surface obtained under the same conditions as in tables 1 and 2 except for screw speed, which was set at 50 rpm. Stock temperatures for control cubes, control C1, example resin A, and resin E respectively were: 379° F., 386° F., 383° F. and 382° F. At this stock temperature, control cubes begin to show chunky flow as in FIG. 9. In FIG. 10, control resin C1 gave a very rough extrudate. FIGS. 11 and 12 illustrate that compounds from Resin Examples A and E respectively, most closely compare to cubes and.

Twin-screw Extrusion

Direct extrusion of powder compounds can be carried out on a twin-screw extruder. In this evaluation, a Cincinnati-Milacron CM-55 conical twin screw extruder was used to compare conventional cubes, and control powder compounds using resins C1 and C2, against a powder compound employing Resin E. The control cubes were formulated as in the previous examples. The following standard formula was used with Resins C1, C2 and D:

|  | Wt. Parts |
|---|---|
| Resin | 100 |
| Calcium Carbonate | 10 |
| Process Aid | 2 |
| Lubricant | 4.0 |

TABLE 3

| Conditions | EXAMPLES | | | |
|---|---|---|---|---|
|  | Cubes | C1 | C2 | E |
| Zone 1 | 300 | 300 | 300 | 300 |
| Zone 2 | 300 | 300 | 300 | 300 |
| Zone 3 | 300 | 330 | 330 | 330 |
| Zone 4 | 300 | 340 | 340 | 340 |
| Die | 315 | 350 | 350 | 350 |
| RPM | 1250 | 1250 | 1250 | 1250 |
| Stock Temp. | 363° F. | 370 | 376 | 372 |
| Powder Feed Rate | — | 150 | 150 | 150 |
| Output Rate #/hr. | 162 | 130 | 125 | 110 |
| Orange Peel Rating | 1 | 5+ | 5 | 3 |
| Micro Surface Roughness | 0.63 | 1.95 | 1.52 | 0.97 |

From Table 3 the advantages of using Resin E in a powder compound can be seen with the use of a multi-screw extruder. At 1250 rpm and a stock temperature of 372° F., powder compound of Resin E exhibited significantly lower surface roughness compared to C1 and C2, and most closely compares to cubes on the basis of visual orange peel rating of 3, whereas pellets from powder compounds using Example C1 and C2 have orange peel ratings of 5+ and 5.

TABLE 4

Figure 14:
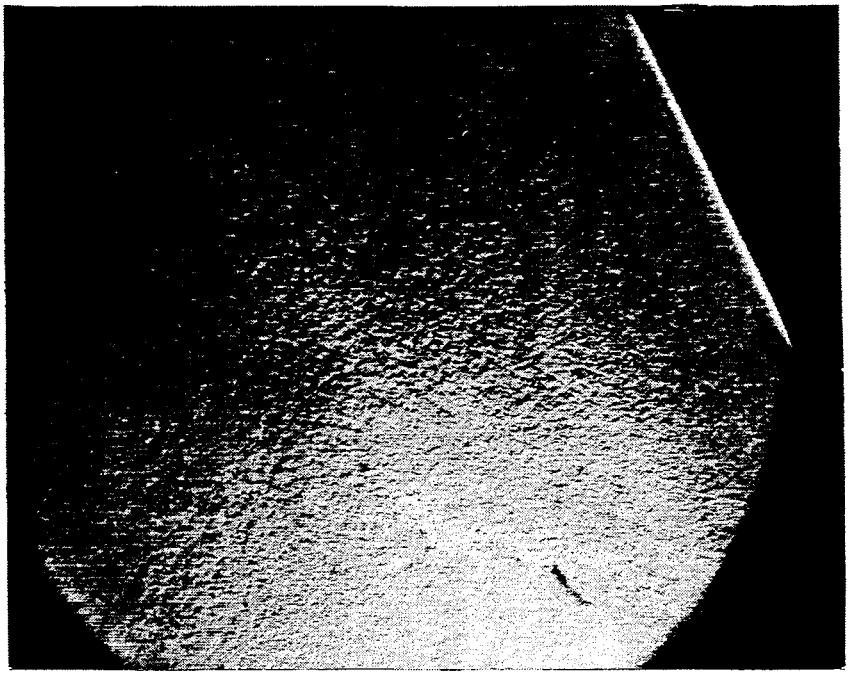
FIG. 14 is a photo micrograph at 1.6× of the surface of an extrudate of control powder compound using resin example C2, extruded with a twin-screw extruder at 750 rpm.
Figure 13:
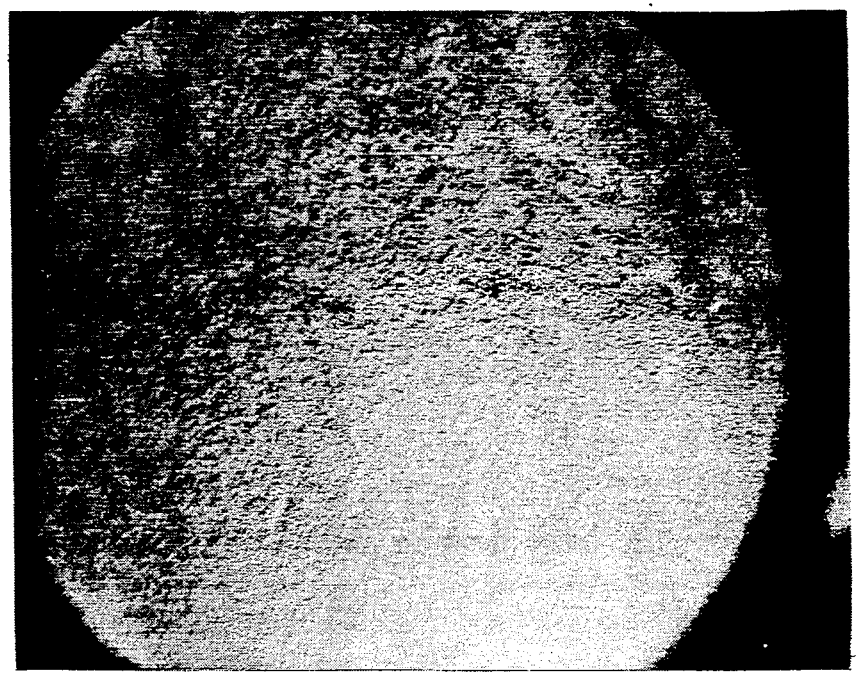
FIG. 13 is a photo micrograph at 1.6× of the surface of an extrudate of control powder compound using resin example C1, extruded with a twin-screw extruder at 750 rpm.
Figure 16:
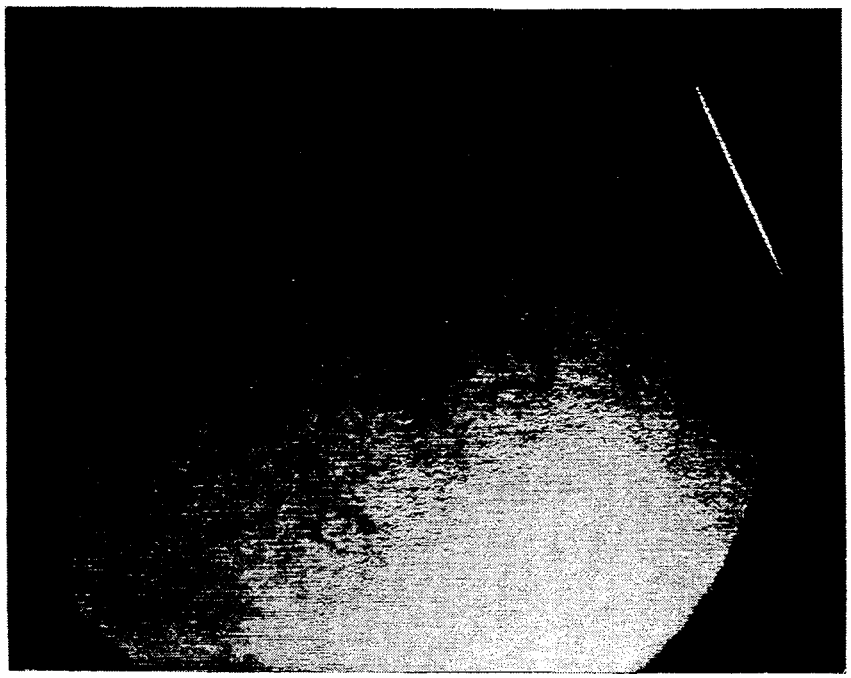
FIG. 16 is a photo micrograph at 1.6× of the surface of an extrudate of powder compound using resin example D, extruded with a twin-screw extruder at 750 rpm.
Figure 15:
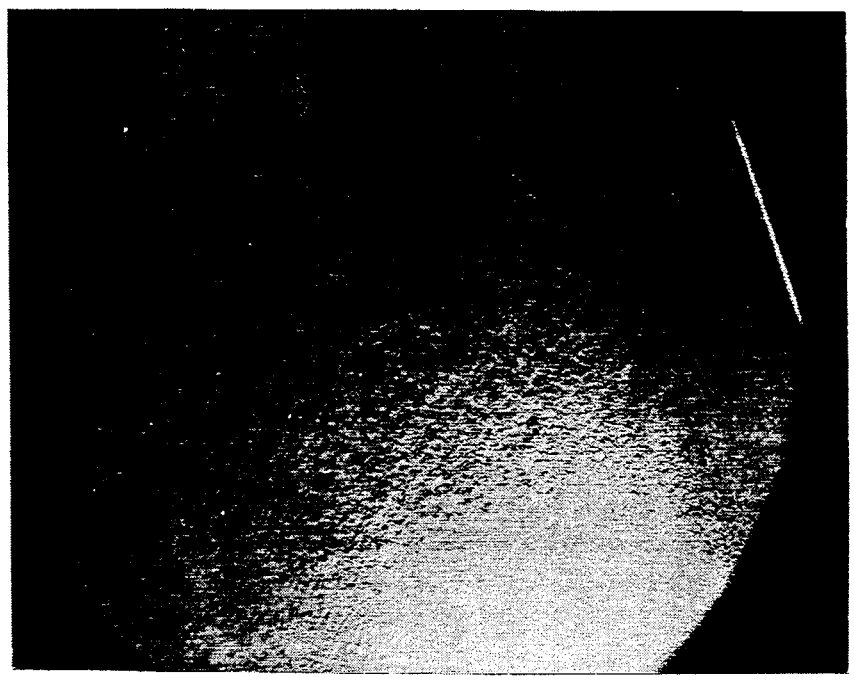
FIG. 15 is a photo micrograph at 1.6× of the surface of an extrudate of powder compound using resin example C, extruded with at twin-screw extruder at 750 rpm.
Figure 17:
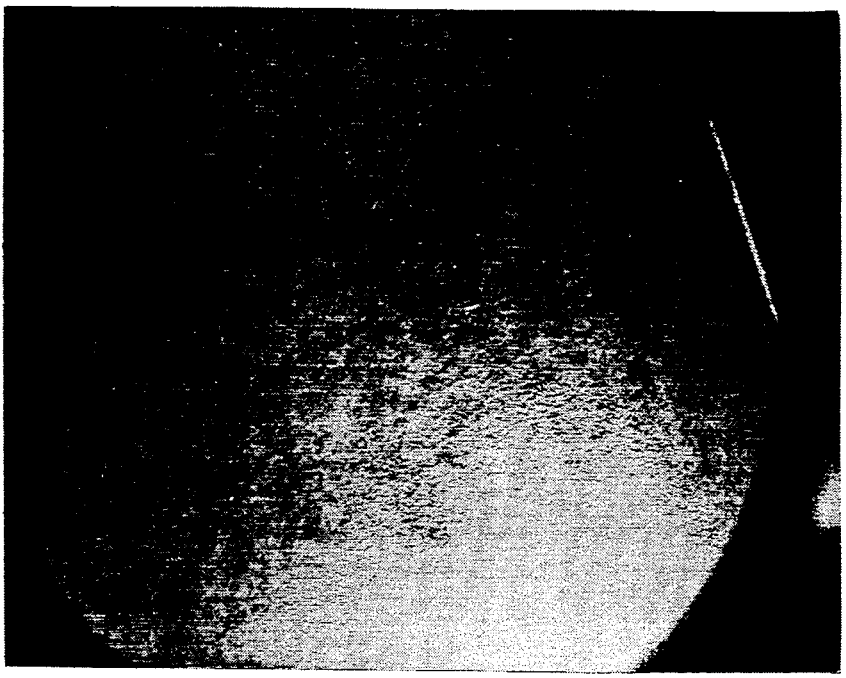
FIG. 17 is a photo micrograph at 1.6× of the surface of an extrudate of control powder compound using resin example B, extruded with a twin-screw extruder at 750 rpm.

| Conditions | Resin | | | | |
|---|---|---|---|---|---|
|  | C1 | C2 | C | D | B |
| Zone 1 (Temp °F.) | 300 | 300 | 300 | 300 | 300 |
| Zone 2 (Temp °F.) | 300 | 300 | 300 | 300 | 300 |
| Zone 3 (Temp °F.) | 300 | 300 | 300 | 300 | 300 |
| Zone 4 (Temp °F.) | 300 | 300 | 300 | 300 | 300 |
| Die (Temp °F.) | 300 | 300 | 300 | 300 | 300 |
| Screw Oil | 300 | 300 | 300 | 300 | 300 |
| Powder Feed Rate | 100 | 100 | 100 | 100 | 100 |
| RPM | 750 | 750 | 750 | 750 | 750 |
| Stock Temp. | 333° F. | 325° F. | 335° F. | 330° F. | 335° F. |
| Output Rate #/hr. | 79 | 85 | 78 | 76 | 72 |
| Avg. Micro Surface ($\mu$) | 1.3 | 1.6 | .6 | .57 | .55 |
| Orange Peel Rating | 2.75 | 2.75 | 2.25 | 2.0 | 2.25 |
| APS/$\mu$ | 169 | 139 | 115 | 102 | 98 |
| Friability | 5+ | 5 | 5 | 3 | 1 |
| See FIG. | FIG. 13 | FIG. 14 | FIG. 15 | FIG. 16 | FIG. 17 |

TABLE 5

Figure 18:
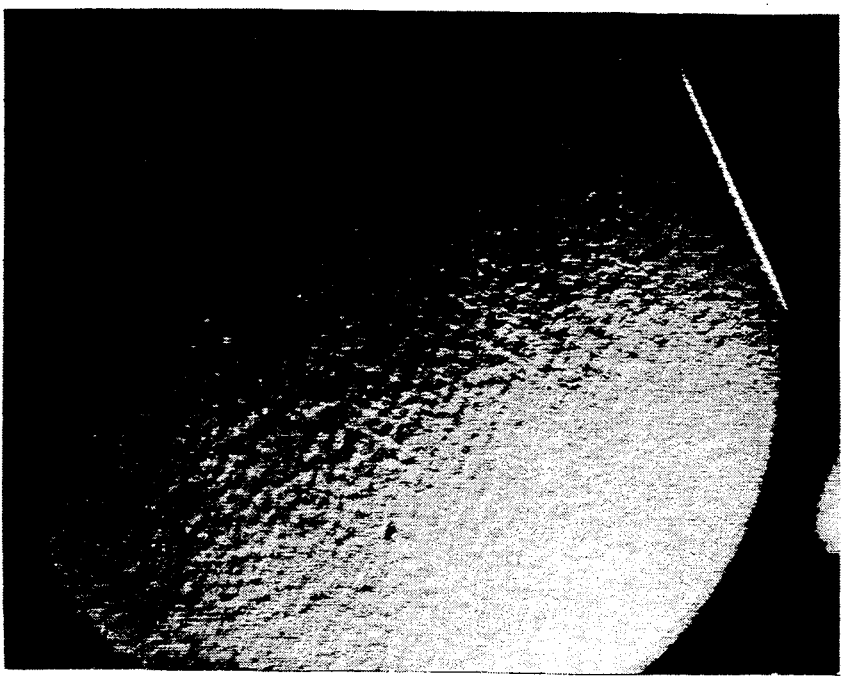
FIG. 18 is a photo micrograph at 1.6× of the surface of an extrudate of control powder compound using resin example C1, extruded with a twin-screw extruder at 1250 rpm.
Figure 20:
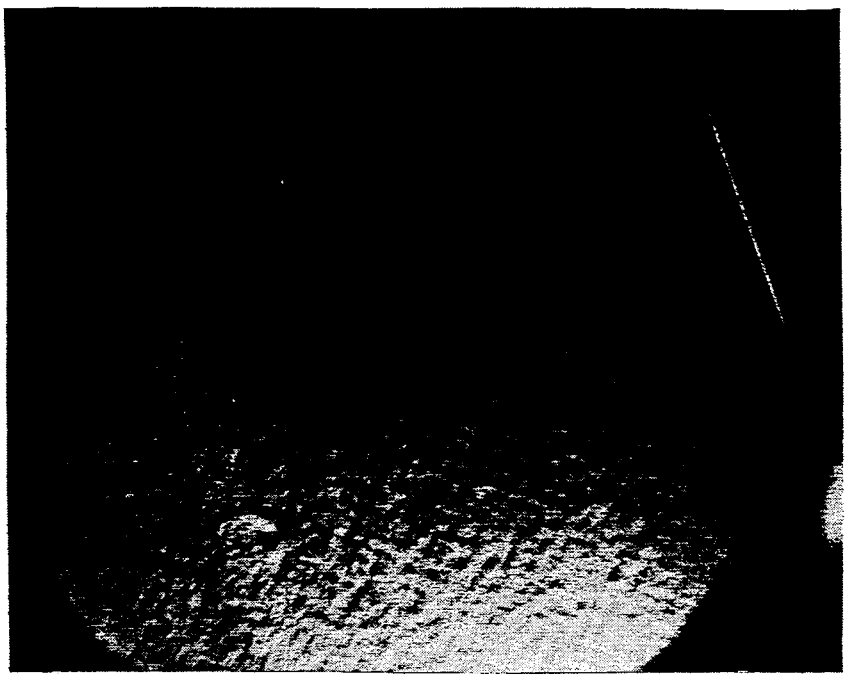
FIG. 20 is a photo micrograph at 1.6× of the surface of an extrudate of powder compound using resin example C, extruded with a twin-screw extruder at 1250 rpm.
Figure 19:
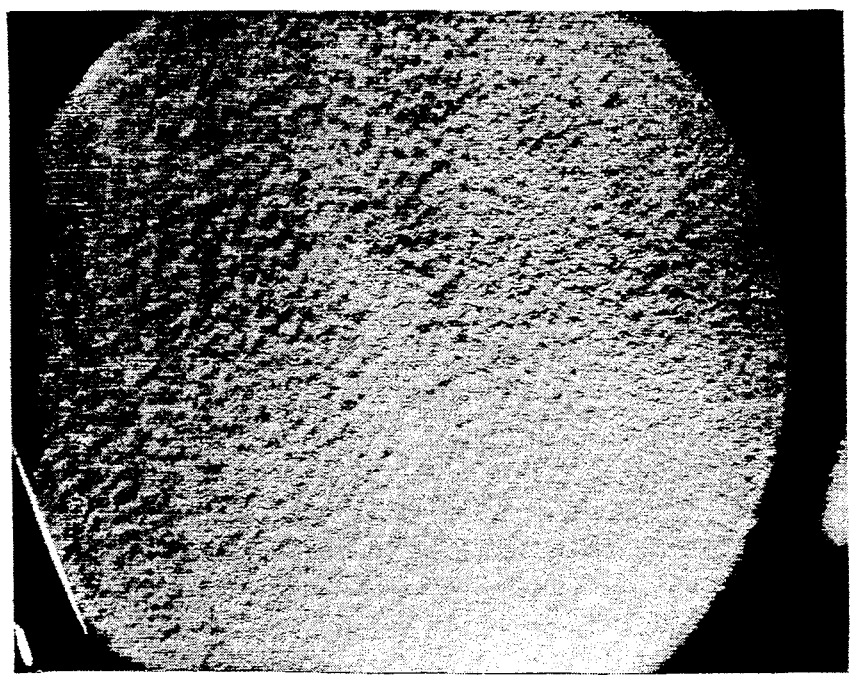
FIG. 19 is a photo micrograph at 1.6× of the surface of an extrudate of control powder compound using resin example C2, extruded with a twin-screw extruder at 1250 rpm.
Figure 22:
FIG. 22 is a photo micrograph at 1.6× of the surface of an extrudate of powder compound using resin example B, extruded with a twin-screw extruder at 1250 rpm.
Figure 21:
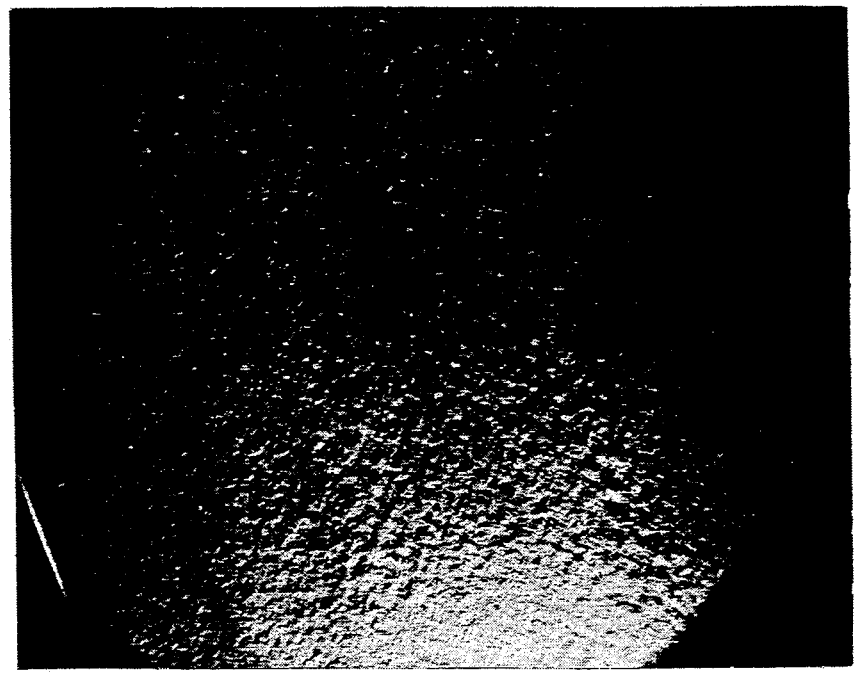
FIG. 21 is a photo micrograph at 1.6× of the surface of an extrudate of powder compound using resin example D, extruded with a twin-screw extruder at 1250 rpm.

| Conditions | Resin | | | | |
|---|---|---|---|---|---|
|  | C1 | C2 | C | D | B |
| Zone 1 (Temp °F.) | 300 | 300 | 300 | 300 | 300 |
| Zone 2 (Temp °F.) | 300 | 300 | 300 | 300 | 300 |
| Zone 3 (Temp °F.) | 300 | 300 | 300 | 300 | 300 |
| Zone 4 (Temp °F.) | 300 | 300 | 300 | 300 | 300 |
| Die (Temp °F.) | 300 | 300 | 300 | 300 | 300 |
| Screw Oil | 300 | 300 | 300 | 300 | 300 |
| Powder Feed Rate | 160 | 160 | 160 | 160 | 100 |
| RPM | 1250 | 1250 | 1250 | 1250 | 1250 |
| Stock Temp. | 361° F. | 360° F. | 364° F. | 362° F. | 360° F. |
| Output Rate #/hr. | 144 | 152 | 144 | 136 | 139 |
| Avg. Micro Surface ($\mu$) | 1.1 | 1.1 | 0.93 | 1.6 | 1.1 |
| Visual Orange Peel | 4.5 | 4.25 | 4.5 | 3.5 | 3.0 |
| APS/$\mu$ | 169 | 139 | 115 | 102 | 98 |
| Friability | 5+ | 5 | 5 | 3 | 1 |
| See FIG. | FIG. 18 | FIG. 19 | FIG. 20 | FIG. 21 | FIG. 22 |

TABLE 6

Figure 24:
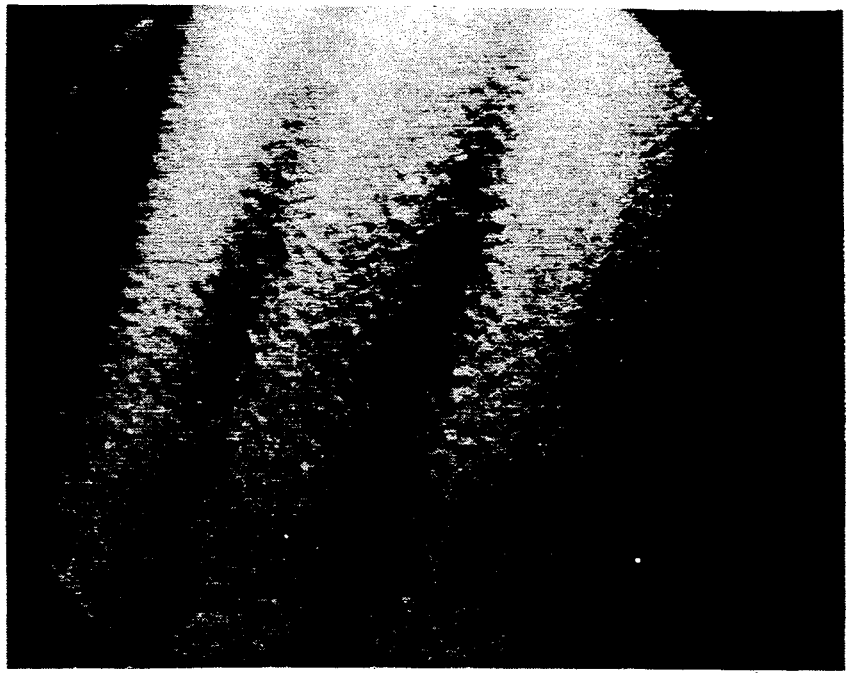
FIG. 24 is a photo micrograph at 1.6× of the surface of an extrudate of control powder compound using resin example C2, extruded with twin-screw extruder at 1600 rpm.
Figure 23:
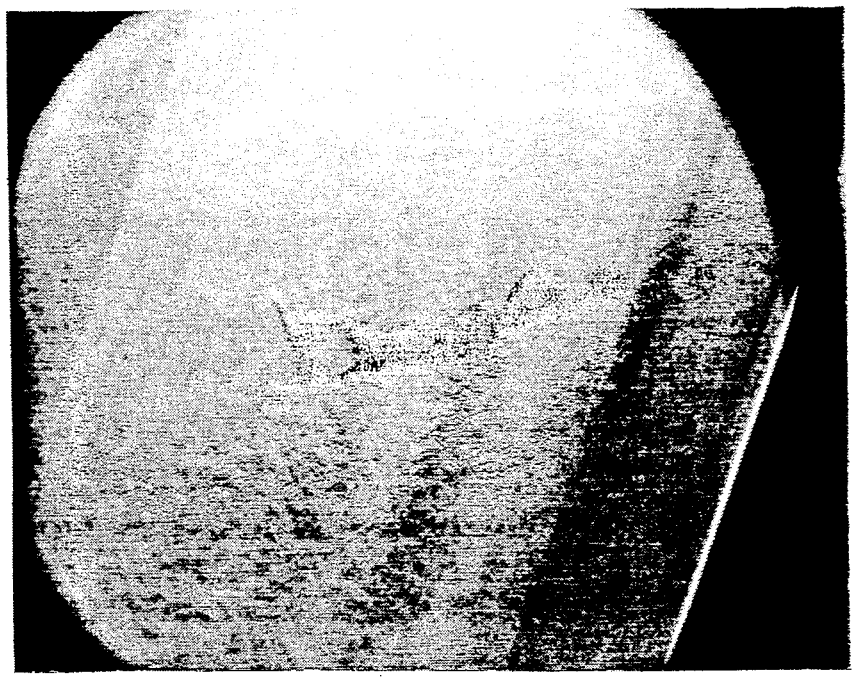
FIG. 23 is a photo micrograph at 1.6× of the surface of an extrudate of control powder compound using resin example C1, extruded with twin-screw extruder at 1600 rpm.
Figure 26:
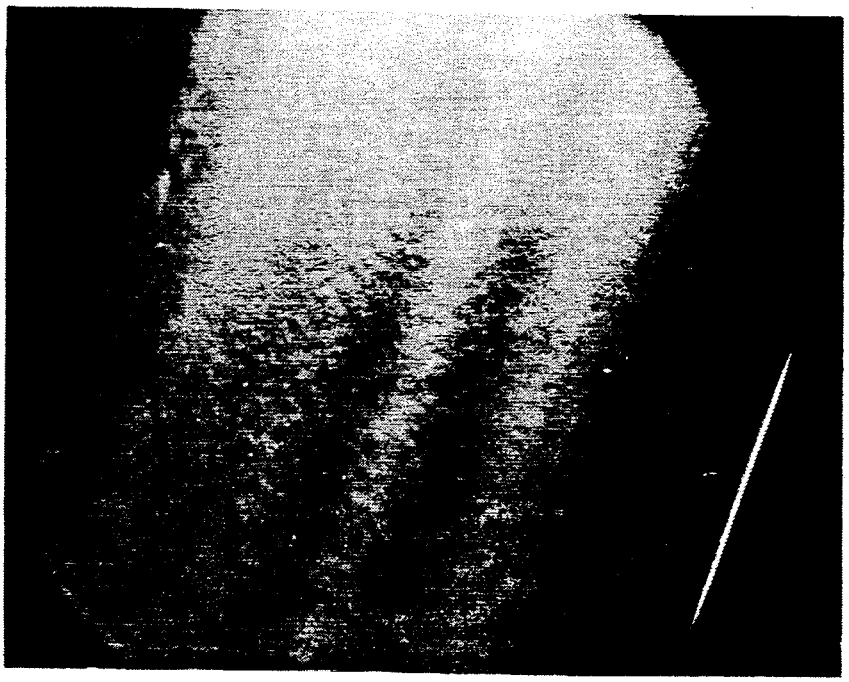
FIG. 26 is a photo micrograph at 1.6× of the surface of an extrudate of powder compound using resin example D, extruded with a twin-screw extruder at 1600 rpm.
Figure 25:
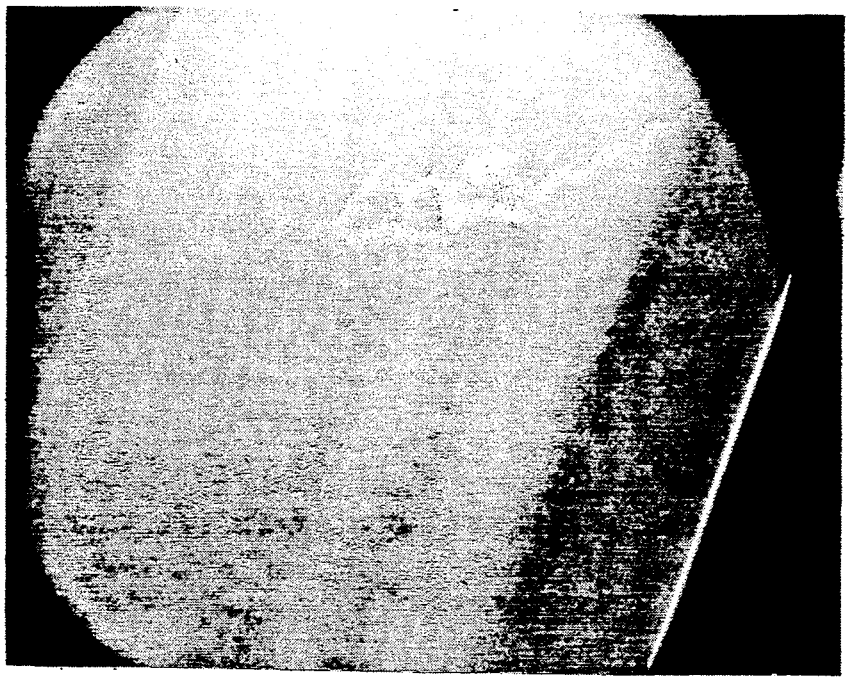
FIG. 25 is a photo micrograph at 1.6× of the surface of an extrudate of powder compound using resin example C, extruded with twin-screw extruder at 1600 rpm.
Figure 28:
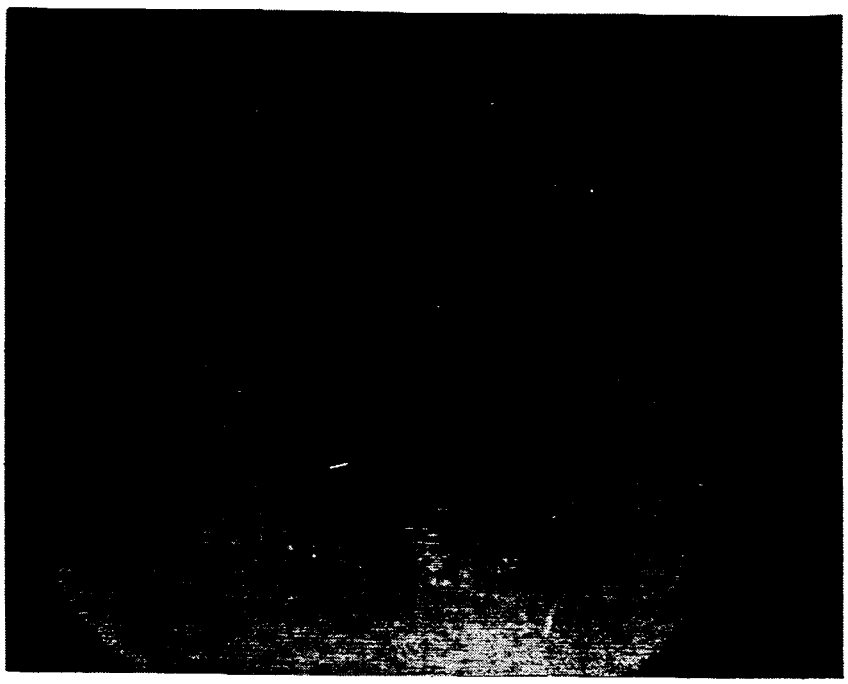
FIG. 28 is a photo micrograph at 1.6× of the surface of an extrudate designated with a visual orange peel standard rating of 1.
Figure 27:
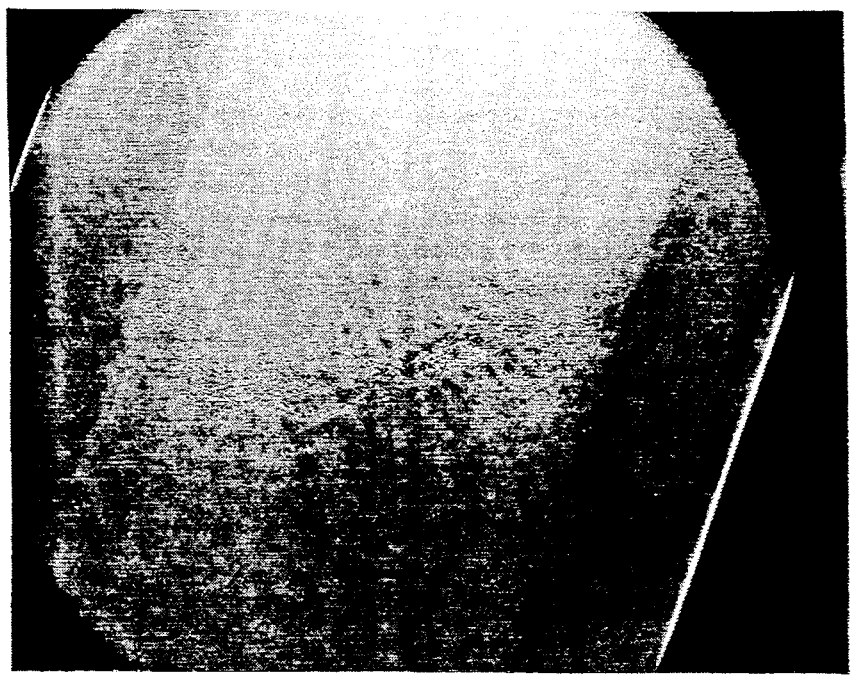
FIG. 27 is a photo micrograph at 1.6× of the surface of an extrudate of powder compound using resin example B, extruded with twin-screw extruder at 1600 rpm.
Figure 30:
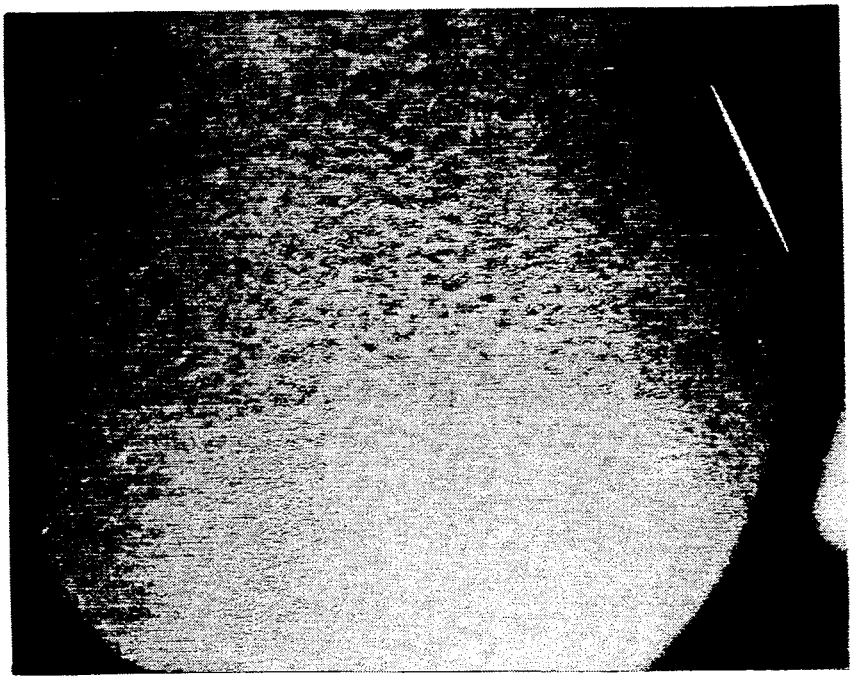
FIG. 30 is a photo micrograph at 1.6× of the surface of an extrudate designated with a visual orange peel standard rating of 3.
Figure 29:
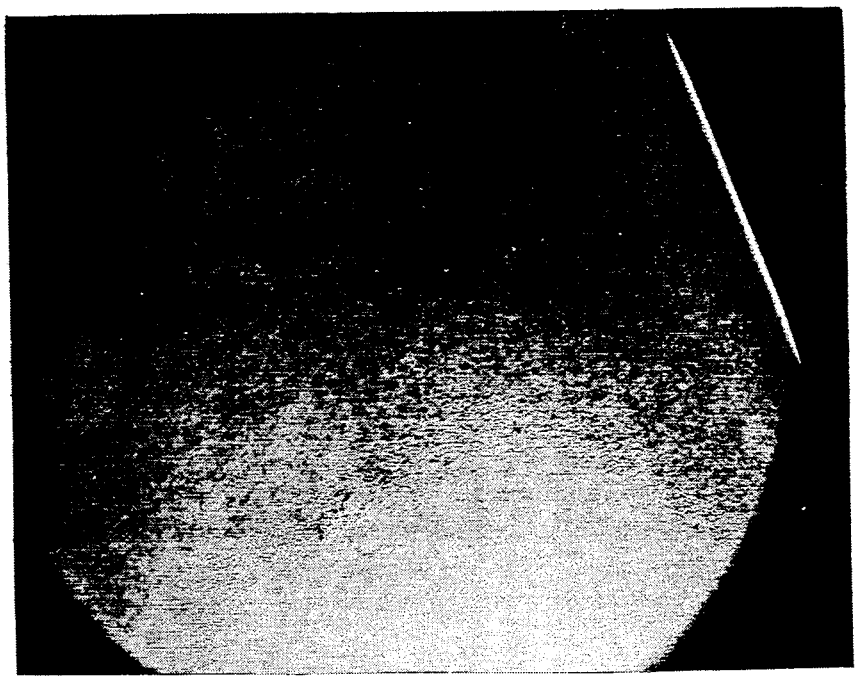
FIG. 29 is a photo micrograph at 1.6× of the surface of an extrudate designated with a visual orange peel standard rating of 2.
Figure 32:
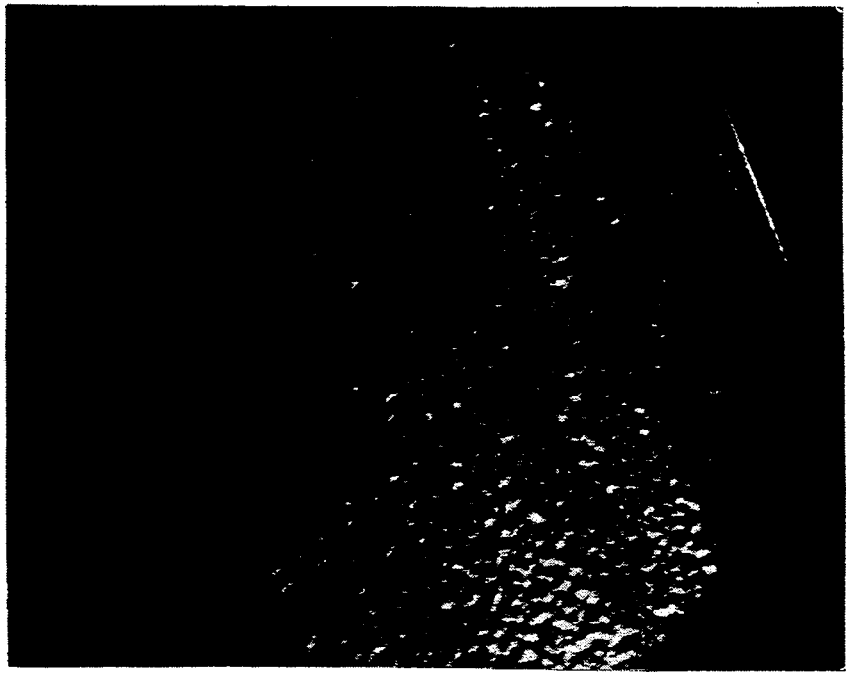
FIG. 32 is a photo micrograph at 1.6× of the surface of an extrudate designated with a visual orange peel standard rating of 5.
Figure 31:
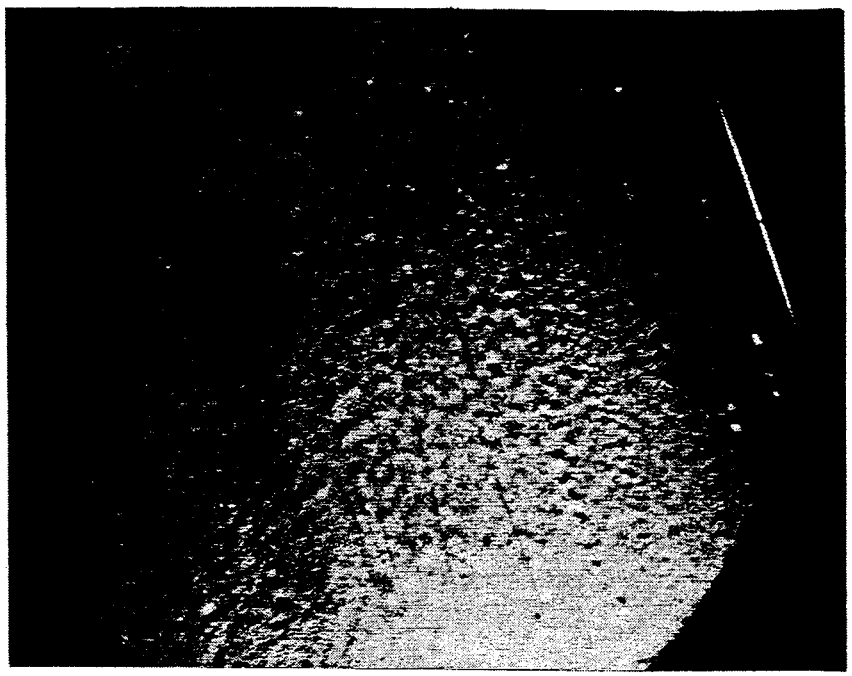
FIG. 31 is a photo micrograph at 1.6× of the surface of an extrudate designated with a visual orange peel standard rating of 4.

| Conditions | Resin | | | | |
|---|---|---|---|---|---|
|  | C1 | C2 | C | D | B |
| Zone 1 (Temp °F.) | 300 | 300 | 300 | 300 | 300 |
| Zone 2 (Temp °F.) | 300 | 300 | 300 | 300 | 300 |
| Zone 3 (Temp °F.) | 300 | 300 | 300 | 300 | 300 |
| Zone 4 (Temp °F.) | 300 | 300 | 300 | 300 | 300 |
| Die (Temp °F.) | 320 | 320 | 320 | 320 | 320 |
| Screw Oil | 300 | 300 | 300 | 300 | 300 |
| Powder Feed Rate | 160 | 160 | 160 | 160 | 100 |
| RPM | 1600 | 1600 | 1600 | 1600 | 1600 |
| Stock Temp. | 385° F. | 385° F. | 385° F. | 387° F. | 390° F. |
| Output Rate #/hr. | 153 | 146 | 145 | 147 | 135 |
| Avg. Micro Surface ($\mu$) | 0.5 | 0.56 | 0.36 | 0.30 | 0.58 |
| Visual Orange Peel | 3.5 | 2.5 | 2.5 | 2.5 | 2.0 |
| APS/$\mu$ | 169 | 139 | 115 | 102 | 98 |
| Friability | 5+ | 5 | 5 | 3 | 1 |
| See FIG. | FIG. 23 | FIG. 24 | FIG. 25 | FIG. 26 | FIG. 27 |

As is shown in Tables 4, 5 and 6 above, the advantages of employing the method of the present invention are seen. In Table 4, powder compounds using resins C, D, and B were compared to powder compounds using control resin C1 and C2 on a twin screw extruder at 750 rpm. The stock temperatures for these compounds ranged from 325° F. to 335° F. Powder compounds from example resins C, D and E exhibit an average micro surface roughness of 0.6, 0.57 and 0.55 respectively. These compare favorably with control resins C1 and C2 wherein the average micro surface roughness was 1.3 and 1.6 microns respectively. FIGS. 13 to 17 illustrate photo micrographs of the resins evaluated in Table 4. As can be seen by the comparison of each figure with a visual orange peel standard rating in FIGS. 20 to 32, acceptable orange peel is seen with the use of resins D and B as compared with control powder compounds using resins C1 and C2.

Table 5 illustrates a comparison of the resins listed in Table 4 on a twin screw extruder at 1250 rpm. At this rpm, stock temperature for the compounds ranged from 360° F. to 364° F. The advantages of the use of the method of present invention can be seen by comparing visual orange peel and average micro surface roughness of the example resins to control resins C1 and C2. FIGS. 18–22 illustrate micro graphs of surfaces of extrudates of these examples and visual orange peel rating, listed in Table 5 is given. Example resin show improved orange peel and in some instances yield commercially acceptable surfaces whereas control resins do not. The resins of the previous examples were evaluated on the twin screw extruder under the conditions listed in Table 6 and at 1600 rpm. At this rpm rate, the stock temperatures ranged from 385° F. to 390° F. As can be seen from Table 6 average micro surface roughness of powdered compound resins using C, and D are improved compared with control powder compounds including resins C1 and C2. FIGS. 22–27 illustrate the surfaces of extrudates from the examples. As is shown by the visual orange peel ratings of example resins, powder compound using resin B exhibited smoother surfaces compared with control resins C1 and C2. Tables 5 and 6 illustrate that in the range of stock temperatures from 350° F. critical aspect of resin friability is shown in order to arrive at commercially acceptable surface for an extrudate as is shown in example B of table 6.

Various changes and modifications may be made in carrying out the present invention without departing from the spirit and scope thereof. For example, extruder screws can be designed to provide reduced shear and more packing capacity at the rear to accommodate the powder compounds used herein. Screw manufacture is beyond the scope of the present invention. Insofar as changes are within the purview of the appended claims, they are to be considered part of the invention.

I claim:

1. In a method for the preparation of pelletized PVC compound from powder, comprising the steps of mixing a polyvinyl chloride resin to form a powder blend and extruding said blend, the improvement comprising employing a PVC resin having a weight average particle size in a range of from 50 microns to 125 microns, a DOP porosity in a range of from about 0.27 cc per gram (cc/gm) of said resin to 0.50 cc/gm, and a resin friability rating of from 0 to 5 and extruding said compound to form pellets at a stock temperature of from about 315° F. to about 350° F.

2. In a method for making an extruded article in an extruder from powder PVC the improvement comprising the step of extruding a powder PVC compound at a stock temperature of from about 350° F. to about 390° F., and employing a particulate polyvinyl chloride resin, wherein said resin has a weight average particle size in a range from 50 microns to 125 microns, a DOP porosity of from 0.27 cc/gm to 0.50 cc/gm, and a resin friability rating of from 0 to 2.

3. A method of claim 2 wherein said extruder is a single screw extruder.

4. A method of claim 2 wherein said extruder is a twin-screw extruder.

5. A method of claim 1 wherein said average particle size is from 60 microns to 115 microns.

6. A method of claim 5 wherein said average particle size is from 70 microns to 100 microns.

7. In a method of extruding a louver from a rigid PVC compound comprising the step of extruding said compound in an extruder, the improvement comprising employing a particulate polyvinyl chloride resin having a weight average particle size in a range of from about 50 microns to about 125 microns, a DOP porosity of from 0.27 cc/gm to 0.5 cc/gm, and a resin friability rating of from 0 to 5, wherein:
when the stock temperature of extrudate is from about 315° F. to about 350° F., said resin has a friability of 0 to 5, and wherein when said stock temperature of extrudate is from about 350° F. to about 390° F. said resin has a friability of from 0 to 2.

8. A method of claim 2 wherein said average particle size is from 60 microns to 115 microns.

* * * * *